United States Patent
Kawanishi et al.

(10) Patent No.: US 7,208,592 B2
(45) Date of Patent: Apr. 24, 2007

(54) PROCESS FOR ALKALI SAPONIFICATION OF CELLULOSE ESTER FILM SURFACE

(75) Inventors: Naoyuki Kawanishi, Kanagawa (JP); Kazuhiko Fujiwara, Kanagawa (JP); Hitoshi Namikawa, Kanagawa (JP); Takahiro Moto, Kanagawa (JP); Yutaka Tamura, Kanagawa (JP)

(73) Assignee: FujiFilm Corporation, Tokyo (JP)

( * ) Notice: Subject to any disclaimer, the term of this patent is extended or adjusted under 35 U.S.C. 154(b) by 0 days.

(21) Appl. No.: 10/368,391

(22) Filed: Feb. 20, 2003

(65) Prior Publication Data

US 2003/0194668 A1 Oct. 16, 2003

(30) Foreign Application Priority Data

Feb. 20, 2002 (JP) ............................. 2002-043673

(51) Int. Cl.
- *C08B 3/00* (2006.01)
- *C08B 5/00* (2006.01)
- *C07H 1/00* (2006.01)

(52) U.S. Cl. ............................ 536/58; 536/68; 536/69; 536/76; 536/124

(58) Field of Classification Search .................. 536/58, 536/68, 69, 76, 124; 264/165
See application file for complete search history.

(56) References Cited

U.S. PATENT DOCUMENTS 4,945,026 A * 7/1990 Tomiyama et al. ......... 430/233
6,649,231 B2 * 11/2003 Ito .............................. 428/1.3

FOREIGN PATENT DOCUMENTS

| JP | 81034323 B | * | 8/1981 |
| JP | 06279756 A | * | 10/1994 |

* cited by examiner

*Primary Examiner*—Shaojia Anna Jiang
*Assistant Examiner*—Everett White
(74) *Attorney, Agent, or Firm*—Sughrue Mion, PLLC

(57) ABSTRACT

A process for alkali saponification of polymer film is disclosed. The process comprises the steps of applying solution of an alkali onto a polymer film having a temperature of not lower than room temperature, and washing away the alkaline solution from the film.

9 Claims, No Drawings

PROCESS FOR ALKALI SAPONIFICATION OF CELLULOSE ESTER FILM SURFACE

FIELD OF THE INVENTION

The present invention relates to a process for alkali saponification of a polymer film. In detail, the invention relates to a process for alkali saponification of a cellulose ester film, which is advantageously used as a transparent support of an optical compensatory sheet in the form of a long band.

BACKGROUND OF THE INVENTION

A liquid crystal display comprises a liquid crystal cell, a polarizing plate and an optical compensatory sheet (phase retarder). In a display of transmission type, two polarizing plates are placed on both sides of the liquid crystal cell, and the optical compensatory sheet is provided between the cell and one or each of the polarizing plates. On the other hand, a display of reflection type comprises a reflection plate, a liquid crystal cell, one optical compensatory sheet and one polarizing plate, piled up in this order.

The liquid crystal cell comprises a pair of substrates, rod-like liquid crystal molecules and an electrode layer. The rod-like liquid crystal molecules are provided between the substrates, and the electrode layer has a function of applying a voltage to the rod-like liquid crystal molecules. According to alignment of the rod-like liquid crystal molecules in the cell, various display modes are proposed. Examples of the display modes for transmission type include TN (twisted nematic) mode, IPS (in-plane switching) mode, FLC (ferroelectric liquid crystal) mode, OCB (optically compensatory bend) mode, STN (super twisted nematic) mode and VA (vertically aligned) mode. Examples of the modes for reflection type include HAN (hybrid aligned nematic) mode.

The polarizing plate generally comprises a pair of transparent protective films and a polarizing membrane provided between them. For preparing the polarizing membrane, a polyvinyl alcohol film is soaked with aqueous solution of iodine or a dichromatic dye, and is then monoaxially stretched.

The optical compensatory sheet is generally provided in various liquid crystal displays, to prevent the displayed image from undesirable coloring and to enlarge a viewing angle of the liquid crystal cell. As the optical compensatory sheet, a stretched birefringent polymer film has been conventionally used.

Recently, in place of the stretched birefringent polymer film, an optical compensatory sheet comprising a transparent support and a thereon-provided optically anisotropic layer formed from liquid crystal molecules (particularly, discotic liquid crystal molecules) has been proposed. The optically anisotropic layer is formed by aligning the liquid crystal molecules and then fixing the alignment. As the liquid crystal molecules, liquid crystal molecules having polymerizable groups are generally used. For fixing the alignment, they are polymerized. The liquid crystal molecules give large birefringence and have various alignment forms, and accordingly an optical compensatory sheet obtained from the liquid crystal molecules has a specific optical characteristic that cannot be obtained from the conventional stretched birefringent polymer film.

The optical characteristic of the optical compensatory sheet is designed according to that of the liquid crystal cell, namely, according to display mode of the liquid crystal cell. If an optical compensatory sheet is made with liquid crystal molecules (particularly, discotic liquid crystal molecules), various optical characteristics can be realized according to the display mode of the liquid crystal cell.

Various optical compensatory sheets using discotic liquid crystal molecules have been proposed according to liquid crystal cells of various display modes. For example, the optical compensatory sheet for liquid crystal cell of TN mode is described in Japanese Patent Provisional Publication No. 6(1994)-214116, U.S. Pat. Nos. 5,583,679, 5,646,703 and German Patent Publication No. 3,911,620. The compensatory sheet for liquid crystal cell of IPS or FLC mode is described in Japanese Patent Provisional Publication No. 10(1998)-54982. The compensatory sheet for OCB or HAN mode is described in U.S. Pat. No. 5,805,253 and International Patent Application No. WO96/37804. The compensatory sheet for STN mode is described in Japanese Patent Provisional Publication No. 9(1997)-26572. The compensatory sheet for VA mode is described in Japanese Patent No. 2,866,372.

The optical compensatory sheet comprising liquid crystal molecules may be laminated on the polarizing plate to form an elliptically polarizing plate, in which the optical compensatory sheet can serve as a transparent protective film on one side of the polarizing plate. The thus-formed elliptically polarizing plate has a layered structure in which a transparent protective film, a polarizing membrane, a transparent support and an optically anisotropic layer formed from liquid crystal molecules are piled up in this order. Since one element plays two roles (namely, since the transparent support serves as both of a support of the optical compensatory sheet and a protective film of the polarizing plate) to simplify the structure, the display can be made thinner and lighter. Further, in preparation of that display, the step of assembling the reduced element (one protective film of the polarizing plate) can be omitted and hence troubles in assembling can be reduced. The above unified elliptically polarizing plate, in which the transparent support serves as both of a support of the optical compensatory sheet and a protective film on one side of the polarizing plate, is described in Japanese Patent Provisional Publication Nos. 7(1995)-191217, 8(1996)-21996 and 8(1996)-94838.

However, a liquid crystal display equipped with the optical compensatory sheet or the aforementioned unified elliptically polarizing plate often gives an image with fine defects. The applicants have studied the cause of that, and found that uneven thickness of the transparent support induces the defects.

In preparing the optical compensatory sheet comprising a transparent support, an orientation layer and an optically anisotropic layer made of fixed liquid crystal molecules, it is necessary to fix closely the orientation layer (normally, made of polyvinyl alcohol) on the transparent support (normally, made of cellulose ester such as cellulose acetate). The affinity between cellulose ester and polyvinyl alcohol is, however, so poor that the interface is easily cracked or broken, and hence an undercoating layer made of gelatin is generally provided on the cellulose ester film to increase the adhesion between the support and the orientation layer. For forming the undercoating layer, a coating solution is prepared and applied on the cellulose ester film. Since the undercoating layer must be fixed well on the cellulose ester film, a solvent (for example, a ketone) soaking well into the cellulose ester film is used as the solvent of the coating solution. However, if the solvent soaks enough to swell the cellulose ester film, the film often shrinks and unevenly winds when it is dried. If the orientation layer and the liquid crystal layer (optically anisotropic layer) are formed on the winding film, the formed orientation layer has uneven thickness and the liquid crystal molecules in the optically anisotropic layer are unevenly aligned according to the winding. Consequently, the resultant liquid crystal display gives an image of poor quality.

In place of providing the undercoating layer of gelatin, the cellulose ester film may be immersed in an aqueous alkaline solution to improve the adhesion between the film and a hydrophilic layer (e.g., the orientation layer). This is generally known as "saponifying bath method", which is described in Japanese Patent Provisional Publication No. 8(1996)-94838. Both top and bottom surfaces of the cellulose ester film are made hydrophilic at the same time by the saponifying bath method, and hence if the film is wound up into a roll after the hydrophilic layer (for example, made of polyvinyl alcohol) is provided on one surface, the hydrophilic layer (which is provided on the top surface) often sticks to the bottom surface (on which the hydrophilic layer is not provided) in the roll. For avoiding this trouble, the surface not to be saponified can be masked and then the film can be immersed in the alkaline solution to saponify only one surface of the film. However, since not only such complicated procedure is additionally needed but also additional wastes are produced, that process is not preferred in consideration of productivity and environmental preservation.

To solve the problem, it is proposed another saponification process comprising the steps of: continuously applying an alkaline solution comprising water (and an organic solvent) onto only one surface of the polymer film on which the orientation layer is to be provided, leaving the film to let the reaction proceed, and washing away the alkaline solution from the film.

However, although some organic solvents neither dissolve nor swell the polymer film, they often abstract additives such as plasticizers from the film. Since most of the additives are hydrophobic, they precipitate while the alkaline solution is diluted when the saponified film is washed with pure water. The deposited precipitates are attached on the film surface, and scatter light to cause haze. As a result, the film gives high haze, and accordingly has poor quality as an optical film.

SUMMERY OF THE INVENTION

An object of the present invention is to saponify a cellulose ester film adequately with alkali, and thereby to produce a large-scale optical compensatory sheet with which a liquid crystal display can give an image without defect.

Another object of the invention is to saponify with alkali a transparent support of an optical compensatory sheet without impairing planeness and transparency.

Further, a third object of the invention is to saponify with alkali a polymer film used as a transparent support of an optical compensatory sheet, and thereby to control preciously the adhesion between the orientation layer and the support.

The alkaline solution comprising an organic solvent more activates the saponification reaction than the solution in which the solvent is pure water alone. However, some organic solvents impair the optical character of the film.

The inventors have studied and finally found that a new saponification process by which the surface of the polymer film can be rapidly saponified without impairing the optical character. The process comprises the steps of: beforehand controlling the temperature of the film surface to be saponified at a predetermined temperature, applying an alkaline saponifying solution, keeping the surface temperature at the predetermined temperature for a certain period, and removing the solution. In the alkaline solution, a surface active agent is incorporated. It is thought that the surface active agent prevents or inhibits the additives from eluting from the film, or otherwise that, even if they are eluted from the film, the surface active agent prevents the eluted additives from precipitating in the washing step.

The organic solvent normally has a lower boiling point than water, and hence evaporates immediately after the solution is applied. Accordingly, the concentration of the alkaline solution increases in a late stage of the saponification step, so that the surface of film is rapidly and evenly saponified. It is presumed that, since the water content increases according as the organic solvent evaporates, the water and the surface active agent cooperatively prevent a carboxylic salt (which is by-produced with the saponification) from precipitating on the film surface. On the other hand, the concentration of the eluted hydrophobic substance increases according as the organic solvent evaporates, and often reaches the solubility limit to deposit the substance before the washing step. Even in that case, it is presumed that the surface active agent stably disperses the hydrophobic substance in the alkaline solution containing much water in the late stage of the saponification step, so that the substance in the solution (which is diluted with water to be essentially an aqueous solution) may be prevented from precipitating on the film surface and may be washed away with water.

The invention provides the alkali saponification processes (1) to (19), the cellulose acetate film having saponified surface (20) and the optical film (21) described below.

(1) A process for alkali saponification of polymer film, comprising the steps of applying solution of an alkali onto a polymer film having a temperature of not lower than room temperature, and washing away the alkaline solution from the film.

(2) A process for alkali saponification of polymer film, comprising the steps of applying solution of an alkali onto a polymer film having a temperature of not lower than room temperature, keeping the temperature of the film not lower than the room temperature, and washing away the alkaline solution from the film.

(3) A process for alkali saponification of polymer film, which comprises the steps of heating a polymer film at a temperature of higher than room temperature, applying solution of an alkali onto the polymer film, keeping the temperature of the film not lower than the room temperature, and washing away the alkaline solution from the film.

(4) The process of one of (1) to (3), wherein the steps are carried out while conveying the polymer film.

(5) The process of one of (1) to (4), wherein the steps are carried out while the polymer film is being conveyed.

(6) The process of one of (1) to (5), wherein the normality of the alkaline solution is in the range of 0.1 to 5 N, and the amount of the applied alkaline solution is in the range of 1 to 50 ml/m$^2$.

(7) The process of one of (1) to (6), wherein the alkali is a hydroxide of alkali metal, and the solvent of the alkaline solution comprises water and one or more organic solvents selected from the group consisting of alcohols having 1 to 8 carbon atoms, ketones having 1 to 6 carbon atoms, esters having 1 to 6 carbon atoms, and polyhydric alcohols having 1 to 6 carbon atoms.

(8) The process of one of (1) to (7), wherein the alkaline solution contains at least one surface active agent selected from the group consisting of nonionic surface active agents, anionic surface active agents, cationic surface active agents and amphoteric surface active agents.

(9) The process of (8), wherein the alkaline solution contains the surface active agent in an amount of 0.1 to 10 wt. %.

(10) The process of (8) or (9), wherein the surface active agent is represented by the formula (1):

R1-L1-Q1    (1)

in which R1 is an alkyl group having 8 or more carbon atoms; L1 is a bond or a divalent linking group between R1 and Q1; and Q1 is a nonionic or anionic hydrophilic group.

(11) The process of one of (8) to (10), wherein the surface active agent is a nonionic surface active agent represented by the formula (2):

R2-L2-Q2    (2)

in which R2 and L2 are the same as R1 and L1 in the formula (1), respectively; and Q2 is a nonionic hydrophilic group selected from the group consisting of polyoxyethylene unit having a polymerization degree of 5 to 150, polyglycerol unit having a polymerization degree of 3 to 30, and a hydrophilic saccharide chain unit.

(12) The process of one of (8) to (10), wherein the surface active agent is an anionic surface active agent represented by the formula (3):

R3-L3-Q3    (3)

in which R3 is the same as R1 in the formula (1); L3 is a divalent linking group having a polar part comprising a combination of units selected from the group consisting of —O—, —CO—, —NR5- in which R5 is an alkyl group having 1 to 5 carbon atoms, —OH, —CH═CH— and —SO$_2$—; and Q3 is an anionic group.

(13) The process of (8) or (9), wherein the surface active agent is a nonionic surface active agent comprising polyoxyethylene, polyoxypropylene or sorbitol as a hydrophilic group, and a hydrophobic group having an alkyl chain of 8 or more carbon atoms.

(14) The process of (8) or (9), wherein the surface active agent is an anionic surface active agent comprising sulfonate or sulfate as a hydrophilic group; a hydrophobic group having an alkyl chain of 8 or more carbon atoms; and at least one selected from the group consisting of hydroxyl, ester group and amido group, positioned between the hydrophilic group and the hydrophobic group.

(15) The process of one of (1) to (14), wherein the alkaline solution has a surface tension of 45 mN/m or less and a viscosity of 0.8 to 20 mPa·s.

(16) The process of one of (1) to (15), wherein the alkaline solution has a density of 0.65 to 1.05 g/cm$^3$.

(17) The process of one of (1) to (16), wherein the alkaline solution has an electro-conductivity of 1 to 100 ms/cm.

(18) The process of one of (1) to (17), wherein the alkaline solution has an absorbance of 0 to 2.0% at the wavelength of 400 nm.

(19) The process of one of (1) to (18), wherein the polymer film is made of cellulose ester.

(20) A cellulose ester film having saponified surface, which is obtained through the process (19).

(21) An optical film comprising the cellulose ester film having saponified surface (20).

On a polymer film saponified with alkali according to one of the above (1) to (19), an orientation layer is provided. Liquid crystal molecules are then applied on the orientation layer, and the alignment of the molecules is fixed to form an optically anisotropic layer. Thus, an optical compensatory sheet is produced.

Further, a polymer film saponified with alkali according to one of the above (1) to (19) is advantageously used in an optical compensatory sheet serving as a transparent protective film of a polarizing plate. In that case, the polarizing plate comprises a pair of transparent protective films and a polarizing membrane, and one of the protective films is the optical compensatory sheet comprising the saponified polymer film, the orientation layer and the optically anisotropic layer made of fixed liquid crystal molecules, piled up in this order.

DETAILED DESCRIPTION OF THE INVENTION

[Polymer Film]

The polymer film preferably has a light transmittance of 80% or more. Further, it is preferred for the polymer film not to show birefringence even if external force is applied.

A polymer generally contains a hydrolysable bond (bond of saponification target) such as ester bond and amido bond. The polymer used in the invention preferably contains ester bond, more preferably ester bond at a side chain. A typical example of the polymer having ester bond at the side chain is cellulose ester.

The polymer is preferably a lower fatty acidic ester of cellulose, more preferably cellulose acetate, and further preferably cellulose acetate having an acetic acid content in the range of 59.0 to 61.5%. Here, the term "acetic acid content" means the weight ratio of the combined acetic acid based on the amount of the cellulose unit. The acetic acid content can be measured and calculated according to ASTM, D-817-91 (Testing methods for cellulose acetate etc.).

The cellulose ester preferably has a viscosity average degree of polymerization (DP) of not less than 250, and more preferably not less than 290. Further, the cellulose ester preferably has a narrow molecular weight distribution in terms of Mw/Mn (wherein Mw means the weight average molecular weight, and Mn means the number average molecular weight), which can be measured by a gel permeation chromatography. The value of Mw/Mn is preferably in the range of 1.0 to 1.7.

In the case where the polymer film is used in an optical compensatory sheet, the polymer film preferably has high retardation values. The retardation values (Re and (Rth) are defined by the following formulas (I) and (II), respectively:

$$Re = |nx - ny| \times d \quad (I)$$

$$Rth = \{(nx + ny)/2 - nz\} \times d. \quad (II)$$

In the formulas (I) and (II), nx is a refractive index along the slow axis (direction giving the maximum refractive index) in the plane of the film, ny is a refractive index along the fast axis (direction giving the minimum refractive index) in the plane of the film, nz is a refractive index along the thickness direction of the film, and d is the thickness of the film in terms of nm.

The retardation value (Re) of the polymer film is preferably in the range of 1 to 200 nm. The retardation value (Rth) is preferably in the range of 70 to 400 nm. They can be obtained by measurement in which incident rays (e.g., rays emitted from He—Ne laser [wavelength: 632.8 nm]) are obliquely applied onto the film surface. In the measurement, an ellipsometer (e.g., M-150, JASCO Corporation) is used to obtain data, which are then extrapolated to find the retardation values.

In order to control the retardation, external force is generally given to the polymer film (for example, the film is stretched). Besides that, an aromatic compound having at least two aromatic rings (described in European Patent No. 0911656A2, Japanese Patent Provisional Publication Nos. 2000-111914 and 2000-275434) can be used as a retardation increasing agent. The retardation increasing agent is added in an amount of 0.01 to 20 weight parts based on 100 weight parts of the polymer.

The retardation increasing agent preferably has a molecular weight of 300 to 800.

The polymer film is preferably prepared according to a solvent cast method. The solvent cast method comprises the steps of dissolving polymer materials in an organic solvent to prepare a solution (dope) and casting the dope to prepare a film.

The organic solvent is preferably selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester may have a cyclic structure. A compound having two or more functional groups of the ether (—O—), ketone (—CO—) and ester (—COO—) also can be used as the organic solvent. The organic solvent may have other functional groups such as alcoholic hydroxyl. If the solvent is the compound having two or more functional groups, the number of carbon atoms is in any of the above ranges.

Examples of the ether having 3 to 12 carbon atoms include diisopropyl ether, dimethoxymethane, dimethoxyethane, 1,4-dioxane, 1,3-dioxolan, tetrahydrofuran, anisole and phenetole.

Examples of the ketone having 3 to 12 carbon atoms include acetone, methylethyl ketone, diethyl ketone, diisobutyl ketone, cyclohexanone and methylcyclohexane.

Examples of the ester having 3 to 12 carbon atoms include ethyl formate, propyl formate, pentyl formate, methyl acetate, ethyl acetate and pentyl acetate.

Examples of the compound having two or more functional groups include 2-ethoxyethyl acetate, 2-methoxyethanol and 2-butoxyethanol.

The halogenated hydrocarbon preferably has one or two carbon atoms, and more preferably has one carbon atom. The halogen atom of the halogenated hydrocarbon preferably is chlorine. The ratio of the substitution of hydrogen with halogen is preferably in the range of 25 to 75 mole %, more preferably in the range of 30 to 70 mole %, further preferably in the range of 35 to 65 mole %, and most preferably in the range of 40 to 60 mole %. Methylene chloride is a representative halogenated hydrocarbon.

Two or more organic solvents can be used in combination.

The polymer solution (dope) can be prepared according to an ordinary method. The ordinary method means that the solution is prepared at a temperature of not lower than 0° C. (room temperature or elevated temperature). The polymer solution (dope) can be prepared through a common process by means of a common apparatus in the normal solvent cast method. In the normal process, a halogenated hydrocarbon (particularly, methylene chloride) is preferably used as the solvent.

The amount of the polymer in the solution is preferably in the range of 10 to 40 wt. %, more preferably in the range of 10 to 30 wt. %. To the organic (main) solvent, additives described below may be optionally added.

The polymer and the organic solvent are mixed and stirred at room temperature (0 to 40° C.) to prepare the solution. For preparing the concentrated solution, the preparation may be carried out at an elevated temperature under a high pressure. In that case, the polymer and the organic solvent are placed in a vessel resisting pressure. After the vessel is sealed, the mixture is stirred under an increased pressure at an elevated temperature. The temperature is controlled so that it may be higher than the boiling point of the solvent at atmospheric pressure but so that the solvent may not boil. The temperature is normally in the range of 40° C. or more, preferably in the range of 60 to 200° C., more preferably in the range of 80 to 110° C.

The components can be preliminary dispersed coarsely, and the coarse dispersion can be placed in the vessel. Otherwise, the components can also be introduced into the vessel in series. The vessel should be equipped with a stirring device. A pressure in the vessel can be formed by introducing an inert gas such as nitrogen gas into the vessel, or by heating and evaporating the solvent to increase the vapor pressure. Further, the components can be added to the vessel at a high pressure after the vessel is sealed.

The vessel is preferably heated from outside. For example, a jacket heater is preferably used. Otherwise, liquid heated with a plate heater placed outside of the vessel may be circulated through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is provided to scratch and renew liquid attached on the inside wall.

In the vessel, various meters such as pressure gauge and thermometer may be provided. The components are dissolved in the solvent in the vessel. The thus-prepared dope may be cooled and then taken out of the vessel, or may be taken out and then cooled with a heat exchanger.

The solution can be prepared according to the cooling dissolution method, which makes it possible to dissolve the polymer in an organic solvent in which the polymer cannot be dissolved by a conventional process. Further, according to the method, the polymer can be rapidly and homogeneously dissolved in an organic solvent in which the polymer can be dissolved by a conventional process.

First in the process of cooling dissolution method, the polymer is gradually added with stirring into an organic solvent at room temperature. The amount of the polymer in the mixture is preferably in the range of 10 to 40 wt. %, more preferably in the range of 10.to 30 wt. %. Various additives described below may be added in the mixture.

The prepared mixture is cooled to a temperature of −100 to −10° C., preferably −80 to −10° C., more preferably −50 to −20° C., most preferably −50 to −30° C. The cooling procedure can be carried out, for example, with dry ice-methanol bath (−75° C.) or with cooled ethylene glycol solution (−30 to −20° C.). Through the cooling procedure, the mixture is solidified.

The cooling rate is preferably 4° C./minute or more, more preferably 8° C./minute or more, and most preferably 12° C./minute or more. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C., preferably 0 to 150° C., more preferably 0 to 120° C., most preferably 0 to 50° C. Through the warming procedure, the polymer is dissolved in the organic solvent. For warming, the mixture may be left at room temperature or may be heated in a warm bath. The warming rate is 4° C./minute or more, more preferably 8° C./minute or more, and most preferably 12° C./minute or more. The warming rate means the change of temperature at the warming step per the time taken to complete the warming step. The change of temperature means the difference between the temperature at which the warming step is started and the temperature at which the warming step is completed.

Thus, a homogeneous solution can be prepared. If the polymer is not sufficiently dissolved, the cooling and warming procedures may be repeated. It can be judged by observation with the eyes whether the polymer is sufficiently dissolved or not.

In the process of cooling dissolution method, a sealed vessel is preferably used to prevent contamination of water, which may be caused by dew condensation at the cooling step. Further, the mixture may be cooled under a reduced pressure so that the time taken to complete the cooling step can be shortened, and hence a vessel resisting pressure is preferably used to conduct the procedures under a reduced pressure.

According to differential scanning calorimetric measurement (DSC), a 20 wt. % solution prepared by dissolving cellulose acetate (acetic acid content: 60.9%, viscosity average polymerization degree: 299) in methyl acetate through the cooling dissolution process has a pseudo-phase transition point between gel and sol at about 33° C. Below that temperature, the solution is in the form of homogeneous gel. The solution, therefore, must be kept at a temperature above the pseudo-phase transition point, preferably at a temperature higher than the pseudo-phase transition point by about 10° C. The pseudo-phase transition point depends upon various conditions such as the organic solvent, the acetic acid content, the viscosity average polymerization degree and the concentration of cellulose acetate.

The polymer film is formed from the prepared polymer solution (dope) according to the solvent cast method.

The dope is cast on a drum or a band, and the solvent is evaporated to form a film. The solid content of the dope is preferably controlled in the range of 18 to 35%. The surface of the drum or band is preferably beforehand polished to be a mirror. The casting and drying steps of the solvent cast method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The surface temperature of the drum or band is preferably 10° C. or below. After cast on the drum or band, the dope is blown with air for 2 seconds or more to dry. The formed film is then peeled, and blown with hot air whose temperature is successively changed from 100° C. to 160° C. in order to evaporate remaining solvent. This procedure is described in Japanese Patent Publication No. 5(1993)-17844. The procedure can shorten the time taken to complete the steps of cooling to peeling. For performing the procedure, the cast dope must gel at the surface temperature of the drum or band.

A plasticizer can be added into the polymer film to enhance mechanical strength of the resultant film or to shorten the time for drying. The plasticizer is, for example, a phosphate ester or a carbonate ester. Examples of the plasticizer are compounds described in Technical Report of Japan Institute of Invention and Innovation (No. 2001-1745, Mar. 15, 2001), pp. 16.

The content of the plasticizer is preferably in the range of 0.1 to 25 wt. %, more preferably in the range of 1 to 20 wt. %, most preferably in the range of 3 to 15 wt. % based on the amount of cellulose ester.

Further, various additives (e.g., ultraviolet absorber, fine particles, releasing agent, antistatic agent, deterioration inhibitor such as oxidation inhibitor, peroxide decomposer, radical inhibitor, metal inactivating agent, oxygen scavenger, amine) may be incorporated in the polymer film. They may be in the form of solid or oil. In the case where the film consists of two or more layers, the kind and the amount of additives in each layer may be different. The deterioration inhibitor is described in detail in Technical Report No. 2001-1745, pp. 17–22. The content of the additives is not particularly restricted as long as they suitably work, but is preferably in the range of 0.001 to 20 wt. % based on the amount of all the compositions of the polymer film.

In addition, the polymer film may be stretched to control the retardation. The stretching ratio is preferably in the range of 3 to 100%.

The thickness of the film is preferably in the range of 30 to 200 µm, more preferably in the range of 40 to 120 µm.

[Alkali Saponification Treatment]

The polymer film is subjected to the alkali saponification treatment comprising the steps of beforehand heating the film to a temperature not lower than room temperature, applying solution of an alkali onto the film, keeping the temperature of the film not lower than room temperature, and washing away the alkaline solution from the film. These steps and steps before or after them are preferably carried out while the film is being conveyed.

[Alkaline Solution]

The alkaline solution for the saponification process of the invention is described below.

The alkaline solution can be prepared by dissolving an alkali in water or in a mixture of water and an organic solvent. The organic solvent is one or more solvents selected from the group consisting of alcohols having 1 to 8 carbon atoms, ketones having 1 to 6 carbon atoms, esters having 1 to 6 carbon atoms, and polyhydric alcohols having 1 to 6 carbon atoms.

[Organic Solvent]

The organic solvents are described in "New Handbook of Solvent (written in Japanese)", Ohm-sha, 1994. Examples of the organic solvent include monohydric alcohols (e.g., methanol, ethanol, n-propanol, isopropanol, n-butanol, isobutanol, 2-butanol, cyclohexanol, benzyl alcohol, fluorinated alcohol), ketones (acetone, methyl ethyl ketone, methyl isobutyl ketone), esters (e.g., methyl acetate, ethyl acetate, butyl acetate), polyhydric alcohols (e.g., ethylene glycol, diethylene glycol, propylene glycol, glycerol), amides (e.g., N,N-dimethyl formamide, dimethylformamide), sulfoxides (e.g., dimethyl sulfoxide), and ethers (e.g., methyl cellosolve, ethylene glycol diethyl ether).

Particularly preferred solvents are methanol, ethanol, n-propanol, isopropanol, n-butanol, isobutanol, 2-butanol, acetone, methyl ethyl ketone, methyl isobutyl ketone, methyl acetate, ethyl acetate, ethylene glycol, diethylene glycol, propylene glycol, and glycerol.

The organic solvent must neither dissolve nor swell the polymer film. Further, the solvent preferably has such a low surface tension that the alkaline solution is easily applied on the film.

The content of organic solvent depends upon various conditions such as the used solvent, the affinity with water (solubility), the reaction temperature and time. For shortening the reaction time for saponification, it is preferred to prepare the solution containing much amount of organic solvent. However, if the organic solvent is contained too much, component (e.g., plasticizer) is liable to be abstracted and the film is excess swollen. Accordingly, the content of organic solvent must be adequately controlled.

The mixing ratio of water/organic solvent is preferably in the range of 3/97 to 85/15 by weight, more preferably in the range of 5/95 to 60/40 by weight, most preferably in the range of 15/85 to 40/60 by weight. If the ratio is in the above range, the whole surface of the film is easily and evenly saponified without impairing the optical character.

[Alkali]

The alkali may be either an inorganic base or an organic base. A strong base is preferred because it can saponify the polymer even in a low concentration. Preferred examples of the alkali include hydroxides of alkali metals (e.g., NaOH, KOH, LiOH), amines (perfluorotributyl amine, triethyl amine, diazabicyclononene, diazabicycloundecyne), tetraalkyl ammonium hydroxide (in which the alkyl group is, for example, methyl, ethyl, propyl or butyl), and free bases of complex salts (e.g., $[Pt(NH_3)_3](OH)_4$). Hydroxides of alkali metals-are more preferred, and NaOH and KOH are most preferred.

The concentration of the alkaline solution depends upon various conditions such as the used alkali, the reaction temperature and the reaction time. If the saponification reaction is to be completed in a short time, the solution is preferably prepared to have a high concentration. However, if the concentration is too high, the solution is so unstable that the alkali is often deposited while the casting procedure is performed for a long time. Accordingly, the alkaline solution has a concentration of preferably 0.1 to 5 N, more preferably 0.5 to 5 N, and most preferably 0.5 to 3 N.

A concentrated alkaline solution generally absorbs $CO_2$ in air to lower the pH value and to form precipitates of carbonate, and hence the atmospheric $CO_2$ concentration is preferably 5,000 ppm or less. For preventing the solution from absorbing $CO_2$, a coater charged with the alkaline solution is preferably sealed or filled with dry air, inert gases or saturated vapor of the organic solvent used in the solution.

[Surface Active Agent]

The alkaline solution of the invention may contain a surface active agent. Even if the substance contained in the film is eluted into the solution, the surface active agent stabilizes the substance not to precipitate or deposit in the washing step.

The amount of surface active agent is determined so that the hydrophobic additives abstracted from the film may be stably dispersed. If the organic solvent in the alkaline solution neither dissolves nor swells the polymer film, the additives are abstracted from only the surface of the film. The amount of the abstracted additives can be estimated to at most 1 wt. % in the alkaline solution, which is applied in an amount of 1 to 50 ml/m². It is found that 10 wt. % of the surface active agent, which is ten times as thick as the abstracted additives, can satisfyingly disperse the additives.

When an orientation layer is formed on the polymer film, some surface active agents impair the adhesion between the film and the orientation layer if they are not fully washed away to remain on the film. Further, they often prevent the liquid crystal molecules from aligning when the liquid crystal is applied. Therefore, it is not preferred to incorporate excess amount of the surface active agent. The amount of the surface active agent is preferably in the range of 0.1 to 10 wt. %, more preferably in the range of 0.5 to 5 wt. %.

The surface active agent preferably used in the saponification process of the invention is not particularly restricted, as long as it can be dissolved or dispersed in the alkaline solution. Either nonionic surface active agents or ionic (anionic, cationic or amphoteric) ones are preferably used. In consideration of solubility and saponification, nonionic and anionic surface active agents are particularly preferred.

The surface active agents may be used either singly or in a combination of different anionic ones, different nonionic ones, or anionic and nonionic ones.

The surface active agents usable in the invention are explained below.

[Nonionic Surface Active Agent]

Examples of the nonionic surface active agent include polyoxyethylenealkyl ethers, polyoxyethylenealkylphenyl ethers, polyoxyethylenepolystyrylphenyl ethers, polyoxyethylene polyoxypropylenealkyl ethers, esters of glycerin fatty acid moiety, esters of sorbitan fatty acid moiety, esters of pentaerythritol fatty acid moiety, esters of propyleneglycol monofatty acid moiety, esters of sucrose fatty acid moiety, esters of polyoxyethylene sorbitan fatty acid moiety, esters of polyoxyethylene sorbitol fatty acid moiety, esters of polyethyleneglycol fatty acid moiety, esters of polyglycerin fatty acid moiety, polyoxyetylenized castor oils, esters of polyethyleneglycerin fatty acid moiety, diethanol amides of fatty acid, N,N-bis-2-hydroxyalkyl amines, polyoxyethylenealkyl amine, fatty acid esters of triethanol amine, and trialkylamineoxide.

The nonionic surface active agent is preferably a compound represented by the formula (1):

R1-L1-Q1.     (1)

In the formula, R1 is a straight or branched alkyl group (which may have a substituent group) having 8 or more carbon atoms. The alkyl group has preferably 8 to 22 carbon atoms, more preferably 10 to 18 carbon atoms.

The alkyl group may have a substituent group. Examples of the substituent group include halogen atoms, an aryl group, a heterocyclic group, an alkoxy group, an aryloxy group, an alkylthio group, an arylthio group, an acyl group, hydroxyl, an acyloxy group, amino, an alkoxycarbonyl group, an acylamino group, oxycarbonyl, a carbamoyl group, sulfonyl, sulfamoyl, sulfoneamide, sulfonyl, and carboxyl.

In the formula (1), L1 is a bond or a divalent linking group, preferably a single bond or a divalent linking group such as —O—, —CO—, —NR11-, —S—, —SO$_2$—, —PO (OR12)-, an alkylene group, an arylene group and a combination thereof. In the above, R11 is hydrogen atom, an alkyl group, an aryl group or an aralkyl group; and R12 is an alkyl group, an aryl group or an aralkyl group.

Preferably, L1 is a single bond or comprises —O—, —CO—, —NR11-, —S—, —SO2-, an alkylene group or an arylene group; and more preferably comprises —O—, —CO—, —NR11-, an alkylene group or an arylene group.

In the case where L1 comprises an alkylene group, the alkylene group has preferably 1 to 10 carbon atoms, more preferably 1 to 8 carbon atoms, and most preferably 1 to 6 carbon atoms. Particularly preferred examples of the alkylene group include methylene, ethylene, trimethylene, tetrabutylene, and hexamethylene.

In the case where L1 comprises an arylene group, the arylene group has preferably 6 to 24 carbon atoms, more preferably 6 to 18 carbon atoms, and most preferably 6 to 12 carbon atoms. Particularly preferred examples of the alkylene group include phenylene and naphthalene.

In the case where L1 comprises a combined divalent linking group of alkylene group and arylene group (namely, aralkylene group), the aralkylene group has preferably 7 to 34 carbon atoms, more preferably 7 to 26 carbon atoms, and most preferably 7 to 16 carbon atoms. Particularly preferred examples of the aralkylene group include phenylenemethylene, phenyleneethylene and methylenephenylene.

The group described above as L1 may have a substituent group. Examples of the substituent group are the same as those described above for R11. In the formula (1), Q1 is a nonionic hydrophilic group.

The nonionic surface active agent is more preferably a compound represented by the formula (2):

R2-L2-Q2   (2)

In the formula (2), R2 and L2 are the same as R1 and L1 in the formula (1), respectively.

In the formula (2), Q2 is a nonionic hydrophilic group selected from the group consisting of polyoxyethylene unit (polymerization degree: 5 to 150), polyglycerol unit (polymerization degree: 3 to 30) and a hydrophilic saccharide chain unit. Preferably, Q2 is a polyoxyethylene unit having a polymerization degree of 10 to 50, a polyglycerol unit having a polymerization degree of 5 to 15, or a hydrophilic saccharide chain unit such as glucose, arabinose, fructose, sorbitol or mannose.

Examples of the nonionic surface active agent include polyethylene glycol, polyoxyethylene lauryl ether, polyoxyethylene nonyl ether, polyoxyethylene cetyl ether, polyoxyethylene stearyl ether, polyoxyethylene oleyl ether, polyoxyethylene behenyl ether, polyoxyethylene polyoxypropylene cetyl ether, polyoxyethylene polyoxypropylene behenyl ether, polyoxyethylene phenyl ether, polyoxyethylene actylphenyl ether, polyoxyethylene stearyl amine, polyoxyethylene oleyl amine, polyoxyethylene stearylic amide, polyoxyethylene oleylic amide, polyoxyethylene castor oil, polyoxyethylene ethyleneabietyl ether, polyoxyethylene nonyne ether, polyoxyethylene monolaurylate, polyoxyethylene monostearate, polyoxyethylene glyceryl monoolate, polyoxyethylene glyceryl monostearate, polyoxyethylene propyleneglycol monostearate, oxyethyleneoxypropylene block polymer, distyrenated phenol polyethyleneoxide adducts, tribenzylphenol polyethyleneoxide adducts, octylphenolpolyoxyethylene polyoxypropylene adducts, glycerol monostearate, sorbitan monolaurylate, and polyoxyethylene sorbitan monolaurylate. The nonionic surface active agent has a weight average molecular weight of preferably 300 to 50,000, more preferably 500 to 5,000.

[Anionic Surface Active Agent]

Examples of the anionic surface active agent include fatty acid salts, abietates, hydroxyalkane sulfonates, alkanesulfonates, dialkylsulfosuccinate esters, olefinsulfates, straight alkylbenzenesulfonates, branched alkylbenzenesulfonates, alkyloxyethylenealkylsulfophenyl ethers, sodium salt of N-methyl-N-oleyltaurine, disodium salt of N-alkylsulfosuccinic monoamide, petroleum sulfonates, sulfuric acid-treated tallow oil, sulfate esters of fatty acid alkyl esters, alkylsulfates, polyoxyethylenealkyl ether sulfates, fatty acid monoglyceride sulfate esters, polyoxyethylenealkylphenyl sulfate ethers, polyoxyethylenestyrylphenyl sulfate ethers, alkylphosphates, polyoxyethylenealkyl ether phosphates, polyoxyethylenealkylphenyl ether phosphates, partially saponified copolymer of styrene/maleic anhydride, partially saponified copolymer of olefin/maleic anhydride, and condensation product of formalin and naphthalene sulfonate.

The anionic surface active agent is preferably a compound represented by the formula (1) in which Q1 is an anionic group. The compound is more preferably represented by the formula (3):

R3-L3-Q3.   (3)

In the formula (3), R3 is a straight or branched alkyl group (which may have a substituent group) having 8 or more carbon atoms. The alkyl group has preferably 8 to 22 carbon atoms, more preferably 10 to 18 carbon atoms.

The alkyl group may have a substituent group. Examples of the substituent group include halogen atoms, an aryl group, a heterocyclic group, an alkoxy group, an aryloxy group, an alkylthio group, an arylthio group, an acyl group, hydroxyl, an acyloxy group, amino, an alkoxycarbonyl group, an acylamino group, oxycarbonyl, a carbamoyl group, sulfonyl, sulfamoyl, sulfoneamide, sulfonyl, and carboxyl.

In the formula (3), L3 is a divalent linking group having a polar part comprising a combination of units selected from the group consisting of —O—, —CO—, —NR5- (in which R5 is an alkyl group having 1 to 5 carbon atoms), —OH, —CH═CH— and $SO_2$. In other wards, L3 contains at least one unit selected from the above group. Particularly preferred polar parts are ester groups (—COO—, —OCO—), amido groups (—CONR5-, —NR5CO—), hydroxyl (—OH), and —CH═CH—.

In the formula (3), Q3 is an anionic group, preferably —COOM, —$OSO_3M$, —P(═O)(OR21) or —$SO_3M$ (in which M is a cation, and R21 is M or an alkyl group having 1 to 3 carbon atoms). Particularly preferably, Q3 is —$SO_3M$.

In the above, M is a counter cation to the anionic group. Examples of the cation M include hydrogen ion, alkali metal ions (e.g., $Li^+$, $Na^+$, $K^+$) and ammonium ion. Alkali metal ions (e.g., $Li^+$, $Na^+$, $K^+$) and ammonium ion are particularly preferred.

[Cationic Surface Active Agent]

Examples of the cationic surface active agent include alkyl amine salts, quaternary ammonium salts such as tetrabutyl ammonium bromide, polyoxyethylenealkyl amines, and polyethylenepolyamine derivatives.

[Amphoteric Surface Active Agent]

Examples of the amphoteric surface active agent include carboxybetaines, alkylaminocarboxylic acids, sulfobetaines, aminosulfates, and imidazolines.

In the above-described compounds, the term "polyoxyethylene" may be replaced with other polyoxyalkylene such as polyoxymethylene, polyoxypropylene or polyoxybutylene. The aforementioned examples of surface active agent include those replaced compounds. Two or more surface active agents as well as single surface active agent can be used in combination, providing that the combination does not impair the effect. Besides these agents, a fluorine-containing surface active agent having a perfluoroalkyl group in its molecular structure may be used. Examples of the fluorine-containing surface active agent include anionic agents such as perfluoroalkyl carbonates, perfluoroalkyl sulfonates and perfluoroalkyl phosphates; amphoteric agents such as perfluoroalkyl amine betains; cationic agents such as perfluoroalkyl trimethylammonium salts; and nonionic agents such as perfluoroalkyl amine acides, perfluoroalkyl ethyleneoxide adducts, oligomers containing perfluoroalkyl group and hydrophilic group, oligomers containing perfluoroalkyl group and oleophilic group, oligomers containing perfluoroalkyl group, hydrophilic group and oleophilic group, and urethane containing perfluoroalkyl group and oleophilic group.

It is preferred to incorporate both nonionic and anionic surface active agents or both nonionic and cationic surface active agents in the alkaline solution. The alkaline solution containing the surface active agents in combination enhances the effect of the invention.

The alkaline solution contains the surface active agents preferably in the range of 0.001 to 20 wt. %, more preferably in the range of 0.01 to 10 wt. %, further preferably in the range of 0.03 to 3 wt. %. If the content of surface active agent is less than 0.001 wt. %, the surface active agent gives little effect. If it is more than 20 wt. %, the film is often insufficiently saponified.

[Defoaming Agent]

The alkaline solution of the invention preferably contains a defoaming agent. The content of the defoaming agent is preferably in the range of 0.001 to 5 wt. %, more preferably in the range of 0.005 to 3 wt. %. If the content is in the above range, the defoaming agent prevents fine babbles from attaching on the film surface so that the polymer film can be evenly saponified with the alkaline solution. The defoaming agent is particularly effective for rapidly and continuously treating a long film.

Examples of the defoaming agent include oils such as castor oil and linseed oil; fatty acids such as stearic acid and oleic acid; fatty acid esters such as natural wax; alcohols such as polyoxyalkylenemonohydric alcohol; ethers such as di-t-amylphenoxy ethanol, heptylcellosolve, nonylcellosolve and 3-heptylcarbitol; phosphates such as tributylphosphate and tris(butoxyethyl)phosphate; amines such as diamylamine; amides such as polyalkylene amide and acylate polyamine; metallic soaps such as aluminum stearate, calcium stearate, potassium oleate and calcium wool oleate; sulfates such as sodium laurylsulfate; and silicones such as silicone oils (e.g., dimethylpolysiloxane, methylphenylpolysiloxane, methylhydrogenpolysiloxane, fluoropolysiloxane, copolymer of dimethylpolysiloxane and polyalkyleneoxide) and their solution type, emulsion type and paste type.

The alkaline solution of the invention further contains organic solvents other than those described above. They serve as dissolving subordinators for the surface active agent and the defoaming agent. There is no particular restriction on the additional solvents as long as they are compatible with water. Examples of them include N-phenylethanol amine, N-phenyldiethanol amine and fluorinated alcohols such as $CnF_{2n+1}(CH_2)_kOH$ (in which n is an integer of 3 to 8; k is 1 or 2), 1,2,2,3,3-heptafluoropropanol, hexafluorobutanediol and perfluorocyclohexanol. The amount of the solvent is preferably in the range of 0.1 to 5 wt. % based on the amount of the solution.

[Antifungal Agent/Antibacterial Agent]

It is further preferred for the alkaline solution to contain an antifungal agent and/or an antibacterial agent. Any antifungal or antibacterial agent can be used as long as it does not affect the saponification with the alkaline solution. Examples of the agents are compounds described in L. E. West, "Water Quality Criteria", Phot. Sci. and Eng., vol. 19, No. 6(1965); Japanese Patent Provisional Publication Nos. 57(1982)-8542, 58(1983)-105145, 59(1984)-126533, 55(1980)-111942 and 57(1982)-157244; H. Horiguchi, "Antifungal and Antibacterial Chemistry (in Japanese)", Sankyo Shuppan (1982); and "Handbook of Antifungal and Antibacterial Technology (in Japanese)", Hakuhodo (1986).

The amount of the antifungal agent and/or the antibacterial agent is preferably in the range of 0.01 to 50 g/L, more preferably in the range of 0.05 to 20 g/L.

[Other Additives]

The alkaline solution may contain other additives. Examples of them include stabilizers (e.g., oxidation inhibitors) and water-soluble compounds (e.g., polyalkylene glycols, natural water-soluble resins), but they by no means restrict the additives used in the alkaline solution of the invention.

[Water]

Water contained in the alkaline solution preferably satisfies the water quality standards regulated in Japanese laws for tap water and hot spring, and WHO water quality standard.

For ensuring the effect of the invention, water having the above quality is preferably used. The content of calcium in the alkaline solution is preferably in the range of 0.001 to 400 mg/L, more preferably in the range of 0.001 to 150 mg/L, further preferably in the range of 0.001 to 10 mg/L. The content of magnesium is preferably in the range of 0.001 to 400 mg/L, more preferably in the range of 0.001 to 150 mg/L, further preferably in the range of 0.001 to 10 mg/L. Polyvalent metal ions other than calcium and magnesium are preferably not contained in the alkaline solution. The amount of polyvalent metal ions is preferably in the range of 0.002 to 100 mg/L. On the other hand, anions such as chloride ion and carbonate ion are also preferably not contained. The content of chloride ion is preferably in the range of 0.001 to 500 mg/L, more preferably in the range of 0.001 to 300 mg/L, further preferably in the range of 0.001 to 100 mg/L. The content of carbonate ion is preferably in the range of 0.001 to 3,500 mg/L, more preferably in the range of 0.001 to 1,000 mg/L, further preferably in the range of 0.001 to 200 mg/L. If the contents of ions are in the above ranges, insoluble products are hardly formed in the solution.

[Properties of Alkaline Solution]

The alkaline solution of the invention comprises the aforementioned components, and preferably has the following properties.

The alkaline solution preferably has a surface tension of 45 mN/m or less and a viscosity of 0.8 to 20 mPa·s. The surface tension and the viscosity are more preferably in the ranges of 20 to 40 mN/m and 1 to 15 mPa·s, respectively. If they are in the above ranges, the solution can be easily and stably applied onto the running film according to the running (transferring) speed. Further, they ensure wettability of the film surface to the solution, retention of the solution on the film, and removability of the solution from the film after saponification.

The alkaline solution has a density of preferably 0.65 to 1.05 g/cm$^3$, more preferably 0.70 to 1.00 g/cm$^3$, and further preferably 0.75 to 0.95 g/cm$^3$. If the density is in the above range, the solution is evenly applied even if blown with air in conveying the film. Further, striped unevenness parallel to the conveying direction, which is often caused by the weight of the film itself, can be avoided. Consequently, the film is evenly saponified.

The alkaline solution has an electro-conductivity of preferably 1 to 100 mS/cm, more preferably 2 to 50 mS/cm, and further preferably 3 to 50 mS/cm. If the conductivity is in the above range, the saponification reaction uniformly proceeds and, after the reaction, the saponifying solution can be easily removed from the film surface. If it is smaller than 1 mS/cm, impurities remains on the saponified film surface to cause many undesirable brilliant points in a displayed image or to impair the adhesion to the optical compensatory layer.

The alkaline solution preferably has an absorbance less than 2.0 at the wavelength of 400 nm.

[Method for Alkali Saponification Treatment]

The saponification process of the invention comprises at least the steps of: beforehand heating the film to a temperature not lower than room temperature, applying solution of alkali onto the film, keeping the temperature of the film not lower than room temperature, and washing away the alkaline solution from the film.

Prior to the step of beforehand heating the film or applying the alkaline solution, the film may be subjected to a discharge treatment, a dustproof treatment or a wet treatment to remove dust from the surface or to make the wettability uniform. These treatments are generally known. For example, the discharge treatment and the dustproof treatment can be carried out according to Japanese Patent provisional Publication Nos. 62(1987)-131500 and 2(1990)-43157, respectively.

The step of beforehand heating the film is preferably carried out by blowing with hot air, by contact heating with a heating roll, by induction heating with microwave, or by radiation heating with an infrared heater. The contact heating with a heating roll is particularly preferred since its conduction efficiency is so high that the step can be carried out in a small area and that the temperature of the film increases rapidly. A commercially available dual jacket roll or electromagnetic induction roll (TOKUDEN LTD.) can be used. The surface temperature of heated film is preferably in the-range of 15 to 150° C., more preferably in the range of 25 to 100° C., most preferably in the range of 30 to 80° C.

The step of applying the alkaline solution is preferably carried out by means of a die coater (extrusion coater, slide coater), a roll coater (clockwise rotating roll coater, counterclockwise rotating roll coater, gravure coater) and a rod (around which a thin wire winds) coater. The procedure for coating is described in various publications (e.g., Modern Coating and Drying Technology, Edward Cohen and Edgar B. Gutoff, Edits., VCH Publishers, Inc., 1992). The amount of the applied solution is preferably as little as possible in consideration of waste water generated in the washing step, and is preferably in the range of 1 to 100 ml/m², more preferably in the range of 1 to 50 ml/m². The solution can be stably applied even in a small area by means of a rod coater, a gravure coater, a blade coater or a die coater, and hence these coating machines are particularly preferred.

The alkaline solution is preferably applied on the bottom surface of the polymer film, so that it can be easily washed away after saponification.

The applied amount of the solution is preferably controlled to fluctuate within 30% or less in the lateral direction of the film or in terms of coating time. The film may be continuously coated with the solution.

The polymer film is preferably saponified under an oxygen gas atmosphere of 0 to 18%. The oxygen gas atmosphere is more preferably in the range of 0 to 15%, most preferably in the range of 0 to 10%. The film is coated with the saponifying (alkaline) solution under such a low oxygen gas atmosphere, and thereby the surface character is controlled to improve the adhesion to a layer provided thereon. Gases other than oxygen in the atmosphere are preferably inert gases (e.g., nitrogen, helium, argon), and nitrogen gas is particularly preferred.

How much the alkali is required to saponify the polymer film depends upon the total number of sites to be saponified (which is the theoretical amount of applied alkali). The total number of sites to be saponified is the product of the number of sites to be saponified per unit area of the film and the depth to be saponified to fix the film closely onto the orientation layer. The more the saponification reaction proceeds, the more the alkali is consumed. Accordingly, the reaction rate gradually lowers, and hence the practical amount of alkali to be applied is preferably several times (preferably twice to twenty times, more preferably twice to five times) as much as the theoretical amount.

The temperature of the alkaline solution is preferably equal to the reaction temperature (which is the temperature of the polymer film). If some organic solvents are used, the reaction temperature is higher than the boiling point of the alkaline solution. In order to apply the solution safely, the reaction temperature is preferably lower than the boiling point of the alkaline solution. The reaction temperature is lower than the boiling point more preferably by 5° C., further preferably by 10° C.

After the alkaline solution is applied, the temperature of the polymer film is kept not lower than room temperature until the saponification reaction is completed. In the present specification, the term "room temperature" means 15° C.

The heating means is determined in consideration of the fact that the polymer film has a surface wetted with the alkaline solution. The reverse surface (not wetted) is heated, for example, by blowing of hot air, by contact heating with a heating roller, by induction heating with microwave or by radiation heating with an infrared heater. The radiation heating with an infrared heater is preferred because the film can be heated without contact with the heater, without drifting air and accordingly without affecting the wetted surface. Examples of the infrared heater include an electric heater, a gas heater, an oil heater, and a far infrared ceramic heater with steam. Also, a commercially available infrared heater (e.g., from Niritake Co., Ltd.) is usable. An oil heater or a steam heater (in which the heating medium is oil or steam, respectively) is preferred since it avoids explosion even if used under an atmosphere of organic solvent. The temperature of the film may be the same as or different from that at which the alkaline solution is applied. The film temperature may be continuously or step-by-step changed during the saponification reaction. The temperature of heated film is preferably in the range of 15 to 150° C., more preferably in the range of 25 to 100° C., most preferably in the range of 30 to 80° C. For measuring the film temperature, a commercially available non-contact infrared thermometer is usable. The heating means may be operated in feedback control so that the film temperature may be in the above range.

The time for keeping the above temperature between applying the solution and washing it away depends on the below-described conveying speed, but is preferably 1 second to 5 minutes, more preferably 2 to 100 seconds, most preferably 3 to 50 seconds.

The saponification treatment is preferably carried out while the polymer film is being conveyed. The conveying speed is determined according to the combination of the alkaline solution and the coating method. The conveying speed is preferably in the range of 10 to 500 m/minute, more preferably in the range of 20 to 300 m/minute.

The alkaline solution preferably has an absorbance less than 2.0 at the wavelength of 400 nm. In the step of applying the solution, the system for supplying the solution and the size of the coater must be determined so that the additives in the film may not be abstracted to increase the absorbance of the solution. If the solution has a high absorbance, the eluted additives often attach on the film surface to cause undesirable brilliant points in a resultant displayed image. For controlling the absorbance, activated carbon can be used to adsorb and remove the eluted additives. There is no restriction on the form or material of the activated carbon as long as it removes the coloring component in the solution. The activated carbon may be directly added in the solution, or otherwise the solution may be introduced into a purifying tank charged with the activated carbon.

There are three methods to stop the saponification reaction between the polymer film and the alkaline solution. The first method comprises the step of diluting the applied alkaline solution to make the alkali concentration low enough to slow down the reaction rate. In the second method, the polymer film coated with the alkaline solution is cooled to slow down the reaction rate. The third method is neutralizing with an acid.

In the first method, the applied alkaline solution may be diluted by applying or spraying a diluting solvent or by immersing the polymer film in the diluting solvent. The diluting solvent is preferably applied or sprayed onto the running polymer film conveyed continuously. It is most preferred to apply the diluting solvent since the alkaline solution can be enough diluted with the minimum and necessary amount of the diluting solvent.

The diluting solvent is preferably applied by means of a coating machine successively after the alkaline solution is applied onto the polymer film. Preferred examples of the coating machine include die coater (extrusion coater, slide coater), roll coater (clockwise rotating roll coater, counterclockwise rotating roll coater, gravure coater) and rod (around which a thin wire winds) coater. The roll coater and the rod coater are preferred to the die coater, because a laminar flow is not formed in the former coaters at a coating bead (a small area where the diluting solvent is applied) so that the alkaline solution and the diluting solvent can be rapidly mixed to lower the alkaline concentration.

The diluting solvent, of course, must dissolve the alkali solute in the alkaline solution to lower the alkaline concentration. Accordingly, the diluting solvent is water or a mixture of water and an organic solvent. Two or more organic solvents may be mixed to use in combination. The aforementioned solvents for the alkaline saponifying solution are preferably used. Water is most preferred.

The amount of diluting solvent is determined according to the concentration of alkaline solution. If the die coater (in which a laminar flow is formed at the coating bead) is used, the alkaline solution is preferably diluted with the diluting solvent to be 1.5 to 10 times (more preferably twice to 5 times) as thin as the original. In the case where the roll coater or the rod coater is adopted, a turbulent flow is formed at the coating bead to mix the alkaline solution and the diluting solvent. Since the thus-formed mixture is applied, the dilution ratio cannot be determined according to the amount of diluting solvent. Accordingly, in that case, the alkali concentration of the diluted solution must be measured. The alkaline solution is also preferably diluted to be 1.5 to 10 times (more preferably twice to 5 times) as thin as the original if the roll coater or the rod coater is used.

An acid can be used to stop rapidly the saponification reaction with alkali. A strong acid is preferred because it can neutralize the alkali even in a low concentration. In consideration of washing with water, the acid preferably forms a salt highly soluble in water. Hydrochloric acid, nitric acid, sulfuric acid, phosphoric acid, chromic acid, methanesulfonic acid and citric acid are particularly preferred.

The applied alkaline solution may be neutralized by applying or spraying an acidic solution or by immersing the polymer film in the acidic solution. The acidic solution is preferably applied or sprayed onto the running polymer film conveyed continuously. It is most preferred to apply the acidic solution since the alkaline solution can be enough neutralized with the minimum and necessary amount of the acidic solution.

The acidic solution is preferably applied by means of a coating machine successively after the alkaline solution is applied onto the polymer film. Preferred examples of the coating machine include die coater (extrusion coater, slide coater), roll coater (clockwise rotating roll coater, counterclockwise rotating roll coater, gravure coater) and rod (around which a thin wire winds) coater. The roll coater and the rod coater are preferred to the die coater, because a laminar flow is not formed in the former coaters at a coating bead (a small area where the acidic solution is applied) so that the alkaline solution and the acidic solution can be rapidly mixed to neutralize the alkali.

The amount of acidic solution is determined according to the concentration of alkaline solution. If the die coater (in which a laminar flow is formed at the coating bead) is used, the amount of the acid is 0.1 to 5 times (more preferably 0.5 times to twice) as much as the amount of the alkali. In the case where the roll coater or the rod coater is adopted, a turbulent flow is formed at the coating bead to mix the alkaline solution and the acidic solution. Since the thus-formed mixture is applied, the neutralizing ratio cannot be determined according to the amount of acidic solution. Accordingly, in that case, the alkali concentration of the neutralized solution must be measured. The alkaline solution is preferably neutralized so that the pH of the neutralized solution may be in the range of 4 to 9 (more preferably 6 to 8) if the roll coater or the rod coater is used.

The polymer film may be cooled to stop the saponification reaction. The film is kept at a temperature not lower than room temperature to promote the reaction, and then cooled enough to stop the reaction essentially.

The cooling means is determined in consideration of the fact that the polymer film has a surface wetted with the alkaline solution. The reverse surface (not wetted surface) is cooled, for example, by blowing of cool air or by contact cooling with a cooling roller. The temperature of cooled film is preferably in the range of 5 to 60° C., more preferably in the range of 10 to 50° C., most preferably in the range of 15 to 30° C. For measuring the film temperature, a commercially available non-contact infrared thermometer is preferably used. The cooling means may be operated in feedback control so that the film temperature may be in the above range.

In the step of washing, the alkaline solution is removed from the film. If the alkaline solution remains, not only the saponification reaction proceeds to excess but also formation of an orientation layer (to be provided on the film) or alignment of liquid crystal molecules in an optically anisotropic layer (to be provided on the orientation layer) is impaired.

The polymer film may be washed by applying or spraying water or by immersing the polymer film in water. Water is preferably applied or sprayed onto the running polymer film conveyed continuously. It is particularly preferred to spray water since the alkaline solution on the film can be turbulently mixed with water.

Water can be sprayed by means of a coating head (e.g., fountain coater, frog-mouth coater) or a spray nozzle (which is used for air humidifying, painting or automatic washing of tanks). The spraying process is described in "All about Coating (written in Japanese)", edited by M. Araki, published by Kako-gijutsu KenKyukai Co., Ltd., 1999. For example, some conical or sectorial spray nozzles are placed side by side in a row across the film so that water may be sprayed onto the whole width of the film. Commercially available spray nozzles (for example, available from Ikeuchi Co., Ltd. or Spraying System Co., Ltd.) may be used.

The higher the spraying speed is, the more turbulently they are mixed. However, if the spraying speed is too high, the continuously conveyed polymer film often runs unstably. The spraying speed is preferably in the range of 50 to 1,000 cm/second, more preferably in the range of 100 to 700 cm/second, most preferably in the range of 100 to 500 cm/second.

The amount of washing water is more than the amount derived from the theoretical dilution ratio defined below theoretical dilution ratio=amount of washing water [ml/m$^2$]+amount of the alkaline solution [ml/m$^2$]

Namely, the theoretical dilution ratio is based on the assumption that all of the water contributes to dilution of the alkaline solution. Practically, however, water is not ideally mixed with the solution, and hence more amount of water is needed. The practical amount of washing water depends on the alkali concentration of the solution, auxiliary additives and the solvent. The amount of washing water is determined so that the alkaline solution may be diluted to be at least 100 to 1,000 times (preferably 500 to 10,000 times, more preferably 1,000 to 100,000 times) as thin as the original.

In the lateral direction of the running film or in terms of spraying time, the sprayed amount of water is preferably controlled to fluctuate within 30% or less. At the both edges of the film, the alkaline solution and the neutralizing acidic solution are often applied in much amount. For washing well the area where much amount of the solutions is applied, much amount of water may be sprayed on the both edges. If a coating head is used, the slit clearance (from which water is jetted out) is widened so that the both edges can be washed with much amount of water. Otherwise, a narrow coater may be additionally provided for locally supplying washing water to the edges. Two or more narrow coaters may be provided. An additional spray nozzle may be provided for locally supplying washing water to the edges.

In the case where a predetermined amount of water is used to wash, the water is preferably divided into several portions and sprayed (sprinkled or applied) in several times. The portions of water are preferably supplied to several washing means provided in tandem along the polymer film. The washing means preferably lines along the film at intervals so that the water may diffuse to dilute the alkaline solution well. More preferably, the film is slopingly conveyed so that the water may run on the film. If so, not only the diffusion but also the flow of water promotes the dilution. Further preferably, draining means for removing a layer of water on the film are provided among the several washing means to further improve the washing and diluting efficiency. Examples of the draining means include a blade (used in a blade coater), an air-knife (used in an air-knife coater), a rod (used in a rod coater) and a roll (used in a roll coater).

The more the washing means are provided in tandem, the more advantageous it is. However, in consideration of space and cost for the equipment, the number of washing means is normally in the range of 2 to 10, preferably in the range of 2 to 5.

Even after the film passes through the draining means, a thin layer of water remains on the film. The layer is preferably as thin as possible, but its thickness is limited according to the draining means. If the draining means is a solid medium physically contacting the polymer film (for example, blade, rod or roll), it is liable to scratch the film surface or to wear down even if the medium is made of soft material such as rubber. Accordingly, the aqueous layer having a certain thickness is indispensable since it serves as lubricant. The thickness of aqueous layer is normally several micrometers, preferably 10 μm or more.

As the draining means, an air-knife is preferred since the aqueous layer can be made the thinnest. A sufficient amount of air is applied at a high pressure so that the aqueous layer may be as thin as possible. However, if the amount of blowing air is too much, the polymer film flaps or waves so that it cannot run stably. The blowing air speed depends upon the original thickness of aqueous layer and the conveying speed, but is normally in the range of 10 to 500 m/second, preferably in the range of 20 to 300 m/second, more preferably in the range of 30 to 200 m/second. In order to remove evenly the aqueous layer, the nozzle and the method for supplying air to the air-knife are selected so that the blowing speed distribution along the width of polymer film may be normally 10% or less, preferably 5% or less. The gap between the nozzle of air-knife and the polymer film is adequately determined. The smaller the gap is, the better the aqueous layer is removed. However, if the gap is too small, the nozzle is liable to touch and damage the polymer film. Accordingly, the air-knife is, set up so that the gap may be normally in the range of 10 μm to 10 cm, preferably in the range of 100 μm to 5 cm, more preferably in the range of 500 μm to 1 cm. On the opposite side to the washed face of polymer film, back-up rolls are preferably provided so that they may face to the air-knife through the polymer film. The back-up rolls make it easy to set the gap adequately, and prevent the polymer film from flapping, waving, wrinkling and deforming.

The polymer film is washed preferably with pure water. The term "pure water" means water having an electric resistivity of at least 0.1 MΩ, containing metal ions (such as Na$^+$, K$^+$, Mg$^{2+}$ and Ca$^{2+}$) in a content of less than 1 ppm and anions (such as Cl— and NO$_3$—) in a content of less than 0.1 ppm. The pure water can be easily obtained through purification with a reverse osmosis membrane, an ion-exchange resin, distillation or combination thereof.

The hotter the washing water is, the better the polymer film is washed. However, when sprayed onto the film, the hot water comes in contact with air in a large surface area, and accordingly vaporizes so much to increase room humidity that the surface of the polymer film is often contaminated with dew condensation. The temperature of the washing water is, therefore, normally in the range of 5 to 90° C., preferably in the range of 25 to 80° C., more preferably in the range of 25 to 60° C.

If insoluble substances are contained in the alkaline solution or are produced by the saponification reaction, a solvent-washing step for removing the insoluble substances may be optionally carried out before or after the above (water-) washing step. In the solvent-washing step, the washing means and the draining means described above are also usable. Organic solvents usable in the solvent-washing step are described in "Pocketbook for Organic Solvent, new edition (written in Japanese)", Ohm, 1994.

A step for drying the polymer film may be carried out after the washing step. Normally, the drying step is not needed because the aqueous layer can be satisfyingly removed with the draining means such as an air-knife. However, to control the water content, the polymer film may be heated and dried before it is wound up into a roll. On contrast, the film may be humidified to control the water content. The temperature of air for drying is preferably in the range of 30 to 200° C., more preferably in the range of 40 to 150° C., further preferably in the range of 50 to 120° C.

After the saponification step, a functional layer may be provided on the film. The alkaline solution is applied on one surface of the film to saponify, and then a functional layer is formed thereon. Even if the thus-treated film is wound up to a roll, the surface of the functional layer is prevented from adhering to the back (bottom) surface.

[Surface Properties of Cellulose Ester Film]

The saponification by applying the alkaline solution reduces "undesirable brilliant points" or "unevenness of displaying". However, the inventors have found that, for surely avoiding "undesirable brilliant points", it is necessary to control the surface properties of the saponified film surface. In other wards, even if the film surface is saponified, "undesirable brilliant points" cannot be reduced without controlling the surface properties. Further, it is also found that, if a liquid crystal display comprising the film having a saponified surface whose properties are not controlled is used for a long time, "fogs" are often observed in a displayed image.

The term "undesirable brilliant points" means defects sparking on a screen of liquid crystal display, and hence the defects are easily observed when a dark image is displayed. According to the inventors' study, the brilliant points are caused by dust attached on the orientation layer or on the optically anisotropic layer. It is also found that the dust is formed when the optical compensatory sheet is cut (or punched out) to size for the display. Because of shock in cutting or punching out the sheet, the orientation layer (together with the optically anisotropic layer) is slightly peeled from the film to form the dust.

The term "fogs" means foggy defects on the screen, and hence they are easily observed when a white image is displayed. The fogs hardly appear immediately after the display is produced, but often appear after the display is used for a long time. According to the inventors' study, a low-molecular weight compound (e.g., plasticizer) contained in the cellulose acetate film (used as the optical compensatory sheet) is gradually deposited for a long time at the interface between the orientation layer and the optically anisotropic layer to cause the fogs. It is also found that the fogs are more liable to be caused in the case where the film is coated with the alkaline solution than in the case where the film is immersed in the alkaline solution bath to saponify.

It is found that, if the surface saponified by coating with the alkaline solution satisfies at least one (preferably, two or more) of the following conditions (1) to (6), not only the merits of the coating saponification are fully given (for example, the surface can be kept smooth) but also the undesirable brilliant points can be avoided without causing the fogs when the optical compensatory sheet is used in a liquid crystal display.

The surface conditions for preventing the cellulose ester film saponified by coating from "undesirable brilliant points" and "fogs" are as follows:

(1) the saponification depth at the surface is in the range of 0.010 to 0.8 μm (preferably in the range of 0.020 to 0.6 μm, more preferably in the range of 0.040 to 0.4 μm);

(2) at the surface, the ratio between numbers of chemical bonds C=O per C—O (C=O/C—O) is in the range of 0 to 0.6 (preferably in the range of 0 to 0.55, more preferably in the range of 0 to 0.5), while the ratio of C—C per C—O (C—C/C—O) is in the range of 0.45 to 0.75 (preferably in the range of 0.5 to 0.7, more preferably in the range of 0.5 to 0.7);

(3) if the cellulose ester film contains a phosphorus compound as plasticizer, the ratio between contents of elements O per C(O/C) at the surface is in the range of 0.62 to 0.75 (preferably in the range of 0.63 to 0.73, more preferably in the range of 0.64 to 0.71), while the ratio of P per C(P/C) is in the range of 0.007 to 0.015 (preferably in the range of 0.008 to 0.0145, more preferably in the range of 0.009 to 0.014);

(4) if the cellulose ester film is made of cellulose acetate, the acetic acid content at the surface is in the range of 1.8 to 2.7 (preferably in the range of 1.85 to 2.5, more preferably in the range of 1.9 to 2.4);

(5) the contact angle with water is in the range of 20° to 55° (preferably in the range of 25° to 50°, more preferably in the range of 30° to 45°); and (6) the surface energy is in the range of 55 to 75 mN/m.

It is not clearly known why the surface satisfying the above conditions is free from the undesirable brilliant points and fogs, but is assumed below.

If the saponification depth is too deep, the main chain of cellulose ester positioned near the surface is cut so that the molecular weight is lowered to impair the mechanical strength and accordingly to deteriorate the adhesion between the film and the orientation layer. Further, since the film surface is excess (and deeply) saponified, much amount of low-molecular weight compound (e.g., plasticizer) comes out and precipitates on the surface. The low-molecular weight compound further comes out for a long time onto the surface of the orientation layer, to cause fogs.

On the other hand, if the saponification depth is too shallow, the film is so insufficiently saponified that the adhesion between the film and the orientation layer is lowered. Further, since the saponification depth is extremely shallow, a little amount of low-molecular weight compound (e.g., plasticizer) positioned near the surface is liable to come out and precipitate for a long time on the surface of the orientation layer.

The condition of coating saponification is controlled so that the cellulose ester film may satisfy the above surface conditions. It is very important to coat the film with the alkaline solution under a low oxygen atmosphere of 18% or less and to wash the alkaline solution with a liquid (preferably, hot water) at a temperature of 30° C. to 80° C.

[Evaluation of Surface Properties]

The surface properties of cellulose ester film in view of the above surface conditions (1) to (5) can be evaluated according the methods described in WO02/46809, pp. 27 to 30.

The surface energy [surface condition (6)], can be measured by the contact angle method, the wet heating method or the adsorption method [these methods are described in "The basic theory and application of wetting (written in Japanese)", published by Realize Co., Ltd, 1989]. The contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at the crossing point.

[Optically Compensatory Sheet]

The saponified polymer film is preferably used as a support of an optical compensatory sheet.

The optical compensatory sheet has a layered structure in which the polymer film saponified by coating with the alkaline solution, a resin layer for preparing an orientation layer, and an optically anisotropic layer comprising liquid crystal molecules whose alignment is fixed are piled up in order.

The orientation layer can be prepared by the steps of: heating the polymer film, applying the alkaline solution onto the film surface on which an orientation layer is to be provided, keeping the temperature of the solution-applied film surface, stopping the reaction, washing away the alkaline solution from the film, and applying and drying a coating solution for preparing the orientation layer. Further, the steps of rubbing the surface of the formed orientation layer and applying and drying the liquid crystal molecules for forming the optically anisotropic layer may be performed to prepare the optical compensatory sheet.

Not only the steps for saponification of the polymer film but also those for forming the orientation layer and the liquid crystal layer (optically anisotropic layer) are preferably carried out on an assembling line in consideration of productivity. If so, the steps are performed in such a short time that the activated saponified surface is less deteriorated. Further, in the water-washing step for the saponification, dust is removed together with the alkaline solution. Furthermore, since it is unnecessary to repeat winding up the film into a roll and drawing out from the roll, loss of the film at the end of the roll is reduced.

The optical compensatory sheet comprises a transparent support of saponified polymer, an orientation layer and an optically anisotropic layer containing discotic structure units, piled up in order. The orientation layer is preferably a crosslinked polymer membrane subjected to rubbing treatment.

As a compound having discotic structure unit contained in the optically anisotropic layer, a discotic liquid crystal compound of low molecular weight (monomer) or a polymer obtained by polymerization of polymerizable discotic liquid crystal molecules can be used. Generally, discotic compounds are roughly classified into two types. One is a compound forming discotic liquid crystal phase (discotic nematic phase), and the other is a compound not forming discotic liquid crystal phase (discotic nematic phase). The discotic compound generally shows negative birefringence, which is used in the optically anisotropic layer.

[Orientation Layer]

For preparing the orientation layer, a membrane made of crosslinked polymer is preferably subjected to rubbing treatment. The orientation layer is more preferably made of two crosslinked polymers. One of the two polymers can be crosslinked by itself or with a crosslinking agent. The polymers which originally have functional groups or to which functional groups are introduced are reacted with light, heat or pH variation to form the orientation layer; or otherwise linking groups are introduced by a reactive crosslinking agent into the polymers so that the polymers can be crosslinked to form the orientation layer.

In a normal process, a coating liquid containing the polymers and, if needed, the crosslinking agent is applied on the transparent support, and then heated to induce the crosslinking reaction. The reaction may be caused at any stage from the step of coating the support with the coating liquid to the step of producing the resultant sheet. In consideration of orientation of the discotic compound (in the optically anisotropic layer) on the orientation layer, the crosslinking reaction is preferably caused sufficiently after the discotic compound is aligned. After the coating liquid containing the polymers and the crosslinking agent is applied and heated to form a layer on the support, the layer is subjected to rubbing treatment to prepare the orientation layer. On the thus-formed orientation layer, another coating liquid containing the discotic compound is applied and heated to the temperature to form discotic nematic phase. The heated liquid on the orientation layer is cooled to prepare the optically anisotropic layer.

Polymers crosslinkable either by itself or with crosslinking agents can be used for forming the orientation layer in the invention. Some polymers may be used in combination. Examples of the polymers include polymethylmetacrylate, acrylic acid/methacrylic acid copolymer, styrene/maleinimide copolymer, polyvinyl alcohol and denatured polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethylcellulose, polyethylene, polypropylene, polycarbonate, and organic substances such as silan coupling agents. Preferred examples are water-soluble polymers such as poly(N-methylolacrylamide), carboxymethylcellulose, gelatin, polyvinyl alcohol and denatured polyvinyl alcohol. Gelatin, polyvinyl alcohol and denatured polyvinyl alcohol are particularly preferred.

It is most preferred to use two kinds of polyvinyl alcohols or denatured polyvinyl alcohols having different polymerization degrees. The saponification degree of the polyvinyl alcohol is in the range of 70 to 100%, preferably in the range of 80 to 100%, more preferably in the range of 85 to 95%. The polymerization degree is preferably in the range of 100 to 3,000. Denaturing groups of the denatured polyvinyl alcohol can be introduced by copolymerization, by chain transfer and by block polymerization. Examples of the denaturing group include a hydrophilic group (e.g., carboxylic group, sulfonic group, phosphonic group, amino group, ammonium group, amido group, thiol group), a hydrocarbon group having 10 to 100 carbon atoms, a fluorine-substituted hydrocarbon group, a thioether group, a polymerizable group (unsaturated polymerizable group, epoxy, azirinidyl group), and an alkoxyl group (trialkoxyl, dialkoxyl, monoalkoxyl). The denatured polyvinyl alcohols are described in Japanese Patent Provisional Publication Nos. 2000-155216 and 2002-62426.

Examples of the crosslinking agent for the polymer (preferably water-soluble polymer, more preferably polyvinyl alcohol or denatured polyvinyl alcohol) include aldehydes, N-methyl compounds, dioxane derivatives, compounds that works when the carboxylic group is activated, active vinyl compounds, active halogen compounds, isooxazoles and dialdehyde starch. Two or more crosslinking agents may be used in combination. Compounds described in Japanese Patent Provisional Publication No. 2002-62426 can be used. Reactive aldehydes are preferred, and glutaraldehyde is particularly preferred.

The amount of the crosslinking agent is in the range of preferably 0.1 to 20 wt. %, more preferably 0.5 to 15 wt. % based on the amount of the polymer. The amount of non-reacted crosslinking agent remaining in the orientation layer is preferably not more than 1.0 wt. %, more preferably not more than 0.5 wt. % based on the amount of the orientation layer. If the layer contains the non-reacted agent in an amount of more than 1.0 wt. %, it has poor durability. A liquid crystal display comprising such orientation layer often suffers troubles of reticulation if used for a long time or left under hot and humid condition.

The orientation layer can be formed by the steps of coating the transparent support with a coating liquid containing the above polymer (material of the orientation layer) and the crosslinking agent, heating to dry and to crosslink the applied polymer, and subjecting the formed layer to rubbing treatment. As described above, the crosslinking reaction may be caused at any step after applying the coating liquid. In the case where a water-soluble polymer such as polyvinyl alcohol is used, the coating solution is preferably prepared from a mixed solvent of water and an organic solvent having defoaming character (e.g., methanol). The ratio of water/methanol is normally in the range of 0:100 to 99:1, preferably in the range of 0:100 to 91:9. Because of defoaming character of the organic solvent, defects on the orientation layer are remarkably decreased, and accordingly the optically anisotropic layer has an improved surface.

As the coating method, known methods such as spin-coating, dip-coating, curtain-coating, extrusion-coating, rod-coating and roll-coating can be adopted. The roll-coating method is particularly preferred. The thickness of the layer after dried is preferably in the range of 0.1 to 10 μm. The applied layer can be dried at a temperature of 15 to 110° C. For ensuring sufficient crosslinking, the temperature is preferably in the range of 60 to 100° C., more preferably in the range of 80 to 100° C. The time for drying is in the range of 1 minute to 36 hours, preferably in the range of 1 minute to 30 minutes. The pH is also preferably adjusted at an optimal value according to the used crosslinking agent. If glutaraldehyde is used as the crosslinking agent, the pH is preferably in the range of 4.5 to 5.5, more preferably at 5.0.

The orientation layer is provided on the transparent support or an undercoating layer. After the above-described polymer layer is crosslinked, the surface of the layer is subjected to rubbing treatment to form the orientation layer. The orientation layer determines the aligning direction of discotic liquid crystal compound provided thereon.

The rubbing treatment can be conducted in the manner adopted widely for aligning liquid crystal molecules of LCD. The surface of the layer is rubbed along a certain direction with paper, cloth (gauze, felt, nylon, polyester) or rubber, to give the aligning function. Generally, the layer is rubbed several times with cloth on which fibers having the same length and thickness are provided.

[Optically Anisotropic Layer]

The optically anisotropic layer of the optical compensatory sheet is provided on the orientation layer. The optically anisotropic layer is preferably a negative birefringent layer comprising a compound having discotic structure unit. The optically anisotropic layer is made of a discotic liquid crystal compound of low molecular weight (monomer) or a polymer obtained by polymerization of polymerizable discotic liquid crystal molecules Examples of the disoctic liquid crystal compound include benzene derivatives described in C. Destrade et al., Mol. Cryst. vol. 71, pp. 111, (1981); truxene derivatives described in C. Destrade et al., Mol Cryst. vol. 122, pp. 141. (1985), Physics lett. A, vol. 78, pp. 82, (1990); cyclohexane derivatives described in B. Kohn et al., Angew. Chem. vol. 96, pp. 70, (1984); and macrocyclic compounds of azacrown-type or phenylacetylene-type described in J. M. Lehn et al., J. Chem. Commun. pp. 1794, (1985), and J. Zhang et al., J. Am. Chem. Soc. vol. 116, pp.2655, (1994). The above discotic compound generally has a structure in which the discotic structure unit is located at the center as a parent core and further straight chain groups such as alkyl, alkoxy and substituted benzoyloxy are radially substituted. The discotic compound includes a compound generally called discotic liquid crystal. A low molecular weight discotic liquid crystal compound having a thermo- or photo-reactive group is polymerized by heat or light to form a polymer that does not behave as liquid crystal. Such polymer can be also used in the invention. Preferred examples of the disoctic liquid crystal compound are described in Japanese Patent Provisional Publication No. 8(1996)-50206.

The optically anisotropic layer is a negative birefringent layer containing a compound having one or more discotic structure units, and the discotic structure units preferably have planes inclined from a plane of the transparent support at an angle varying along the depth of the optically anisotropic layer.

The above-described angle (inclined angle) of the plane of discotic structure unit generally increases or decreases with increase of distance in the direction of depth from the bottom of the optically anisotropic layer. The inclined-angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The inclined angle preferably totally increases or decreases in the layer, even if it does not vary in the course. The inclined angle more preferably increases totally, and it is particularly preferred to increase continuously.

The optically anisotropic layer can be generally prepared by the steps of coating the orientation layer with a solution of the discotic compound and other compounds dissolved in a solvent, drying, heating to a temperature for forming a discotic nematic phase, and cooling with the oriented condition (discotic nematic phase) kept. Otherwise, the layer can be prepared by the steps of coating the orientation layer with a solution of the discotic compound and other compounds (e.g., polymerizable monomer, photopolymerization initiator) dissolved in a solvent, drying, heating to a temperature for forming a discotic nematic phase, polymerizing the heated layer (e.g., by radiation of UV light) and cooling. The transition temperature from discotic nematic phase to solid phase (temperature for heating) is preferably in the range of 70 to 300° C., especially 70 to 170° C.

The inclined angle of the discotic unit on the support side can be generally controlled by selecting the discotic compound or materials of the orientation layer, or by selecting methods for the rubbing treatment. The inclined angle of the discotic unit on the surface side (air side) can be generally controlled by selecting the discotic compound or other compounds (e.g., plasticizer, surface active agent, polymerizable monomer and polymer) used together with the discotic compound. Further, the extent of variation of the inclined angle can be also controlled by the above selection.

Any compound can be employed as the plasticizer, the surface active agent or the polymerizable monomer, as long as it is compatible with the discotic compound and it gives variation of the inclined angle or dose not inhibit the discotic compound molecules from aligning. Polymerizable monomers (e.g., compounds having a vinyl, vinyloxy, acryloyl or methacryloyl group) are preferably used. Those compounds are generally used in the amount of 1 to 50 wt. % (preferably 5 to 30 wt. %) based on the amount of the discotic compound.

As the polymer, any polymer can be employed as long as it is compatible with the discotic compound and gives variation of the inclined angle. Cellulose esters are preferably used. Examples of the cellulose esters include cellulose acetate, cellulose acetatepropionate, hydroxypropyl cellulose and cellulose acetatebutylate. The polymer is generally used in an amount of 0.1 to 10 wt. % (preferably 0.1 to 8.0 wt. %, more preferably 0.1 to 5.0 wt. %) based on the amount of the discotic compound, in order not to inhibit the discotic compound from aligning.

[Polarizing Plate]

The polarizing plate has a layered structure comprising the optical compensatory sheet (in which the polymer film, the orientation layer and the optically anisotropic layer made of aligned and fixed liquid crystal molecules are piled up in order), a polarizing membrane and a transparent protective film, piled up in order. The transparent protective film may be made of normal cellulose acetate.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films.

The relation between the slow axis of the polymer film (in the optical compensatory sheet) and the transparent axis of the polarizing plate depends upon the kind of applied liquid crystal display. If the display works according to TN, MVA or OCB, they are placed essentially parallel. If the display is a reflection type, they are preferably positioned so that the angle between them may be essentially 45°.

[Liquid Crystal Display]

The optical compensatory sheet or the polarizing plate is advantageously used in a liquid crystal display.

A liquid crystal display of TN, MVA or OCB mode comprises a pair of polarizing plates and a liquid crystal cell provided between them. The liquid crystal cell comprises a pair of electrode substrates and liquid crystal molecules placed between them. The optical compensatory sheet is provided between the cell and one or each of the polarizing plates.

In the liquid crystal display of OCB mode, the optical compensatory sheet has the polymer film and a thereon-provided optically anisotropic layer comprising a discotic compound or a rod-like liquid crystal compound. The optically anisotropic layer can be prepared through the steps of aligning the discotic molecules (or rod-like liquid crystal molecules) and fixing the alignment. The discotic molecules give large birefringence and have various alignment forms, and accordingly the optical compensatory sheet obtained from the discotic molecules has a specific optical characteristic that cannot be obtained from the conventional stretched birefringent polymer film. The optical compensatory sheet prepared from the discotic molecules is described in Japanese Patent Provisional Publication No. 6(1994)-214116, U.S. Pat. Nos. 5,583,679, 5,646,703 and West German Patent Publication No. 3,911,620A1.

As the transparent protective film provided between the liquid crystal cell and the polarizing membrane in the polarizing plate, the aforementioned polymer film can be used. The polymer film may be used as the protective film (placed between the liquid crystal cell and the polarizing membrane) in either one or each of the polarizing plates.

The liquid crystal cell works preferably according to OCB mode or TN mode.

The liquid crystal cell of OCB mode is a liquid crystal cell of bend alignment mode in which rod-like liquid crystal molecules in upper part and ones in lower part are essentially reversely (symmetrically) aligned. A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

In a liquid crystal cell of TN mode, rod-like liquid crystal molecules are essentially horizontally aligned while voltage is not applied, and oriented in a twisted alignment with a twisted angle of 60 to 120°. The liquid crystal cell of TN mode is widely used in color TFT liquid crystal displays, and hence is described in many publications.

EXAMPLE 1

(Preparation of Cellulose Ester Film CF-1)

The following components were poured into a mixing tank, and stirred and heated to dissolve each component. Thus, a cellulose acetate solution A was prepared.

| Cellulose acetate solution A | |
|---|---|
| Cellulose acetate (acetic acid content: 60.9%) | 100 weight parts |
| Triphenyl phosphate (plasticizer) | 7.0 weight parts |
| Biphenyldiphenyl phosphate (plasticizer) | 4.0 weight parts |
| Methylene chloride (first solvent) | 402.0 weight parts |
| Methanol (second solvent) | 60.0 weight parts |

The following components were poured into a disperser, and stirred to dissolve and mix the components. Thus, a matting agent solution was prepared.

| Matting agent solution | |
|---|---|
| Silica particles (mean particle size: 16 nm, AEROSIL R972, Nippon Aerosil Co., Ltd.) | 2.0 weight parts |
| Methylene chloride (first solvent) | 76.3 weight parts |
| Methanol (second solvent) | 11.4 weight parts |
| Cellulose acetate solution A | 10.3 weight parts |

The following components were poured into a mixing tank, and stirred and heated to dissolve each component. Thus, a retardation increasing agent solution was prepared.

| Retardation increasing agent solution | |
| --- | --- |
| The following retardation increasing agent | 19.8 weight parts |
| The following UV absorber (A) | 0.07 weight part |
| The following UV absorber (B) | 0.13 weight part |
| Methylene chloride (first solvent) | 58.4 weight parts |
| Methanol (second solvent) | 8.7 weight parts |
| Cellulose acetate solution A | 12.8 weight parts |

(Retardation increasing agent)

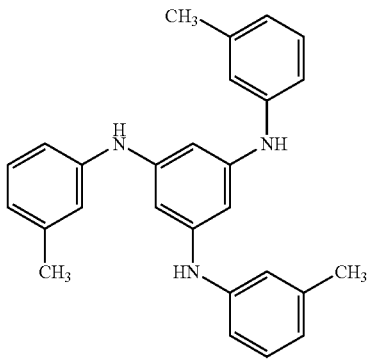

(UV absorber A)

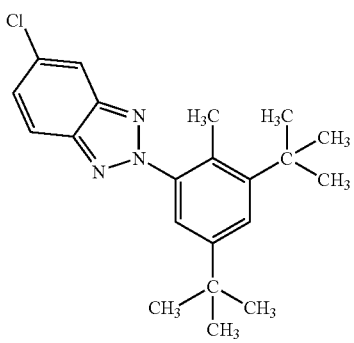

(UV absorber B)

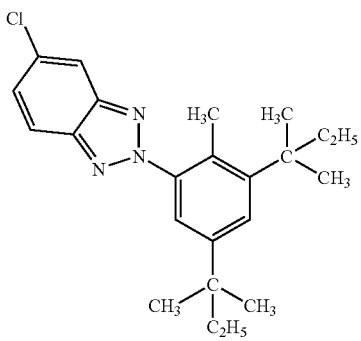

Each solution was filtered, and then 94.6 weight parts of the cellulose acetate solution A, 1.3 weight parts of the matting agent solution and 4.1 weight parts of the retardation increasing agent solution were mixed. The weight ratio of the retardation increasing agent per cellulose acetate was 4.6%. The mixture was cast by means of a band caster. When the solvent remaining in the formed film reached 30%, the film was peeled from the band. After dried until the remaining solvent reached 13 wt. %, the film was laterally stretched by 28% with a tenter at 130° C. and then held to keep the stretched width for 30 seconds at 140° C. The film was released from the tenter, and dried at 140° C. for 40 minutes. Thus, a cellulose acetate film CF-1 was prepared. The prepared film contained the remaining solvent in the amount of 0.2%, and had the thickness of 72 μm.

(Preparation of Saponified Film KF-2)

The cellulose acetate film CF-1 was made to pass through an induction-heater roll (heated at 60° C.), and thereby the film was heated to 40° C. The heated film was coated with 1.0 N KOH solution (alkaline saponifying solution S-2) consisting of 5.6 g of KOH, 66.1 g of isopropyl alcohol, 15 g of propylene glycol and 13.3 g of water in the amount of 14 ml/m² by means of a rod-coater. Prior to the coating, the alkaline solution was beforehand heated to 40° C. The film was then exposed to a far-infrared heater made of steel (Noritake Co., Ltd.) heated at 110° C. for 7 seconds, and coated with pure water in the amount of 3 ml/m² by means of rod-coater to wash away the alkali. In this step, the temperature of the film was kept 40 to 45° C. After water was applied, the KOH concentration of the coating layer was 0.6 N. The film was then washed with water by means of a fountain coater, and blown with air jetted from an air-knife to drain the aqueous layer. The washing with the fountain coater and the draining with the air-knife were repeated three times, and then the film was left in a drying zone at 70° C. for 5 seconds. Thus, a saponified film KF-2 was prepared.

The alkaline saponifying solution S-2 had the surface tension of 24 mN/m, the viscosity of 4.2 Pa·s, the density of 0.90 and the electro-conductivity of 6.9 mS/cm.

(Preparation of Saponified Film KF-3)

The procedure of KF-2 was repeated to saponify the cellulose acetate film CF-1 while the CF-1 was being conveyed, except that an anionic surface active agent A consisting of 60 mol. % of $CH_3-(CH_2)_{11}-CH=CH-SO_3Na$ and 40 mol. % of $CH_3-(CH_2)_{13}-SO_3Na$ was incorporated into the alkaline solution S-2 in the amount of 1 wt. % to prepare an alkaline saponifying solution S-3, which was used in place of S-2. Thus, a saponified film KF-3 was prepared.

(Preparation of Saponified Film KF-4)

The procedure of KF-2 was repeated to saponify the cellulose acetate film CF-1, except that the aforementioned anionic surface active agent A was incorporated into the alkaline solution S-2 in the amount of 0.1 wt. % to prepare an alkaline saponifying solution S-4, which was used in place of S-2. Thus, a saponified film KF-4 was prepared.

(Preparation of Saponified Film KF-5)

The procedure of KF-2 was repeated to saponify the cellulose acetate film CF-1, except that the aforementioned anionic surface active agent A was incorporated into the alkaline solution S-2 in the amount of 10 wt. % to prepare an alkaline saponifying solution S-5, which was used in place of S-2. Thus, a saponified film KF-5 was prepared.

(Preparation of Saponified Film KF-6)

The procedure of KF-2 was repeated to saponify the cellulose acetate film CF-1, except that a nonionic surface active agent B consisting of $C_{16}H_{33}-O-(CH_2CH_2-O)_{10}-H$ was incorporated into the alkaline solution S-2 in the amount of 1 wt. % to prepare an alkaline saponifying solution S-6, which was used in place of S-2. Thus, a saponified film KF-6 was prepared.

(Preparation of Saponified Film KF-7)

The procedure of KF-2 was repeated to saponify the cellulose acetate film CF-1, except that a nonionic surface active agent C consisting of sorbitan monostearate POE ether (Tween 60) was incorporated into the alkaline solution S-2 in the amount of 1 wt. % to prepare an alkaline saponifying solution S-7, which was used in place of S-2. Thus, a saponified film KF-7 was prepared.

(Preparation of Saponified Film KF-8)

The procedure of KF-2 was repeated to saponify the cellulose acetate film CF-1, except that the following anionic surface active agent D was incorporated into the alkaline solution S-2 in the amount of 1 wt. % to prepare an alkaline saponifying solution S-8, which was used in place of S-2. Thus, a saponified film KF-8 was prepared.

(Anionic surface active agent D)

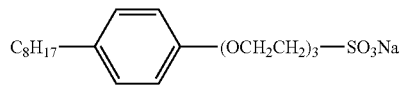

(Preparation of Saponified Film KF-9)

The procedure of KF-2 was repeated to saponify the cellulose acetate film CF-1, except that the following anionic surface active agent E (SDBS) was incorporated into the alkaline solution S-2 in the amount of 1 wt. % to prepare an alkaline saponifying solution S-9, which was used in place of S-2. Thus, a saponified film KF-9 was prepared.

(Anionic surface active agent E)

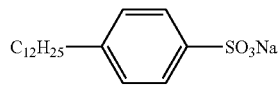

(Preparation of Saponified Film KF-10)

The procedure of KF-2 was repeated to saponify the cellulose acetate film CF-1, except that the following anionic surface active agent F (ATO) was incorporated into the alkaline solution S-2 in the amount of 1 wt. % to prepare an alkaline saponifying solution S-10, which was used in place of S-2. Thus, a saponified film KF-10 was prepared.

(Anionic surface active agent F)

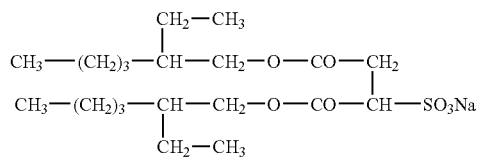

(Evaluation of Polymer Film)

The haze values of the saponified films KF-2 to KF-10 were measured by means of an optical tester (NDH-300A type, Nippon Denshoku Co., Ltd.).

(Formation of Orientation Layer)

On the saponified surface of each of the cellulose acetate film CF-1 and the saponified films KF-02 to KF-10, a coating solution consisting of 20 weight parts of the following denatured polyvinyl alcohol, 360 weight parts of water, 120 weight parts of methanol and 0.5 weight part of glutaraldehyde was applied in the amount of 30 ml/m² by means of a rod coater. The layer of the applied solution was exposed to air heated at 60° C. for 60 seconds, and further exposed to air heated at 90° C. for 150 seconds to dry. The dried layer was then subjected to rubbing treatment with a velvet rubbing roll placed perpendicularly to the conveying direction, to form an orientation layer.

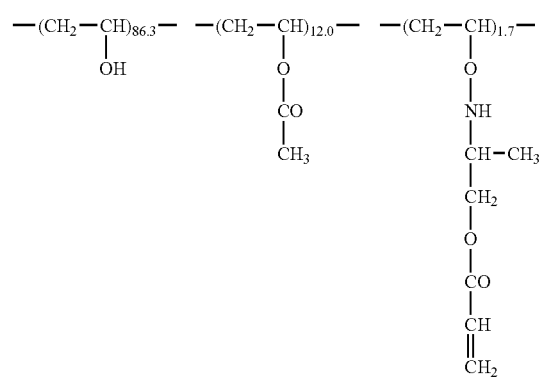

(denatured polyvinyl alcohol)

(Formation of Optically Anisotropic Layer)

In 102 weight parts of methyl ethyl ketone, 41.01 weight parts of the following discotic compound, 1.22 weight parts of ethylene oxide denatured trimethlolpropanetriacrylate (V#360, Osaka Organic Chemicals Co., Ltd.), 2.84 weight parts of multi-functional acrylate monomer (NK ester A-TMMT, Shin Nakamira Chemical Industries Co., Ltd.), 0.90 weight part of cellulose acetate butyrate (CAB551-0.2, Eastman Chemical), 0.23 weight part of cellulose acetate butyrate (CAB531-1, Eastman Chemical), 1.35 weight parts of a photo-polymerization initiator (Irgacure 907, Ciba-Geigy) and 0.45 weight part of a sensitizer (Kayacure DETX, Nippon Kayaku Co., Ltd.) were dissolved to prepare a coating solution. The coating solution was then applied by means of a wire bar coater of #4 onto the orientation layer formed on each of the films CF-1 and KF-02 to KF-10. The film was conveyed into a heating zone in which air heated at 130° C. was blown, to heat for 2 minutes so that the molecules of the discotic compound might be aligned. While the temperature of the film surface was kept at about 100° C., the film was placed under an atmosphere of 80° C. and exposed to ultraviolet rays emitted from a high pressure mercury lamp of 120 W/cm for 0.4 seconds, thereby the molecules of the discotic compound were polymerized to form an optically anisotropic layer. Thus, optical compensatory sheets KHF-1 to KHF-10 were produced.

The Re retardation value of the optically anisotropic layer was measured at 633 nm, and found 45 nm. The average angle between the disc planes and the transparent support (average inclined angle) was also found 39°.

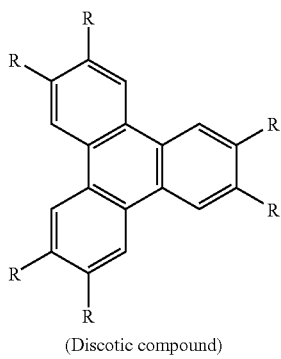

(Discotic compound)

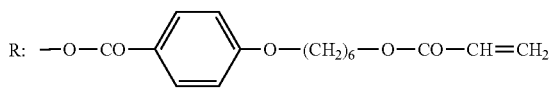

(Evaluation of Optical Compensatory Sheet)

Each of the optical compensatory sheets KHF-1 to KHF-10 was inserted between a pair of polarizing plates placed in cross-Nicol arrangement. Light transmitted through the sheet and the plates was observed with the eyes to evaluate unevenness of the light, and thereby defects and unevenness of the optically anisotropic layer and the alignment of discotic molecules were estimated. According to the observation, the compensatory sheets were classified into the following four grades A, B, C and D:

A: no unevenness was observed (if 100 persons observed it, none of them recognized the unevenness);

B: unevenness was slightly observed (if 100 persons observed it, a few (1 to 3) of them recognized the unevenness);

C: unevenness was somewhat observed (if 100 persons observed it, several (4 to 20) of them recognized the unevenness); and D: unevenness was considerably observed (if 100 persons observed it, many (more than 20) of them recognized the unevenness).

Each compensatory sheet was cut into pieces (30 cm×25 cm), and one of them was left for 1 day under the conditions of the temperature of 25° C. and the relative humidity of 60%. After that, 100 adhesive tapes (width: 1.2 cm, length: 10 cm; Nichiban, No. 405) were attached on the surface of the sheet (piece) on the optically anisotropic layer side. Each tape was then one by one successively peeled off for 1 second, and it was observed whether the sheet was broken at the interface between the orientation layer and the film. The adhesion between the layer and the film was relatively evaluated according to how many tapes broke the sheet.

The results were set forth in Table 1.

TABLE 1

| Sheet | Surfactant | Amount of surfactant | Haze | Grade[1] | Tapes[2] |
|---|---|---|---|---|---|
| KHF-1 | (No surface treatment) | | | D | 100 |
| KHF-2 | Not used | | 1.26 | B | 3 |
| KHF-3 | A | 1.0 wt. % | 0.33 | A | 0 |
| KHF-4 | A | 0.1 wt. % | 0.46 | A | 0 |
| KHF-5 | A | 10 wt. % | 0.34 | A | 1 |
| KHF-6 | B | 1.0 wt. % | 0.29 | A | 0 |

TABLE 1-continued

| Sheet | Surfactant | Amount of surfactant | Haze | Grade[1] | Tapes[2] |
|---|---|---|---|---|---|
| KHF-7 | C | 1.0 wt. % | 0.32 | A | 0 |
| KHF-8 | D | 1.0 wt. % | 0.37 | A | 0 |
| KHF-9 | E | 1.0 wt. % | 0.84 | B | 1 |
| KHF-10 | F | 1.0 wt. % | 0.97 | B | 1 |

Remarks:
[1]Grade: in view of unevenness and defects, and
[2]Tapes: number of adhesive tapes breaking the sample in the peeling test.

As shown in Table 1, the compensatory sheets comprising the films saponified according to the present invention (KHF-3 to KHF-10) were superior in the haze to KHF-2 which contained no surface active agent (surfactant). On the other hand, they are remarkably improved in evenness of the transmitted light and the adhesion (measured in the peeling test). A comparison sample containing the surface active agent (surfactant) in the amount of 0.08% exhibited the same performance as KHF-2. Another comparison sample containing the surface active agent (surfactant) in the amount of 12 wt. % and KHF-1, which was not subjected to surface treatment, exhibited too poor performance to use as optical compensatory sheets.

EXAMPLE 2

The procedure for preparing KHF-3 in Example 1 was repeated except that each surface active agent (surfactant) shown in Table 2 was added to the alkaline solution S-2, to prepare saponified films KF-11 to KF-16. Samples KHF-11 to KHF-16 were produced from the films KF-11 to KF-16, and evaluated. As a result, it was found that all the samples gave the same performance as KHF-3.

TABLE 2

| Film | Alkaline solution | Surfactant (amount) |
|---|---|---|
| KF-11 | S-11 | K-1 (1.0 wt. %) |
| KF-12 | S-12 | K-2 (1.0 wt. %) |
| KF-13 | S-13 | K-3 (1.0 wt. %) |
| KF-14 | S-14 | K-4 (0.8 wt. %) + K-5 (0.2 wt. %) |
| KF-15 | S-13 | K-6 (1.0 wt. %) |
| KF-16 | S-13 | K-7 (1.0 wt. %) |

Remarks:
K-1: $C_{14}H_{29}O(CH_2CH_2O)_{10}H$
K-2: Ethylenediamine ethylene oxide (30 mol) adduct
K-3: $C_{10}H_{21}O(CH_2CH(CH_3)O)_{10}H$
K-4: $C_{18}H_{37}O(CH_2CH_2O)_8H$
K-5: polyethylene glycol
K-6: $[C_8H_{17}NH(CH_2)_2]_2NH^+.CH_2COO-$
K-7: $C_{12}H_{25}(NHCH_2CH_2)_2NH^+.CH_2COO-$

EXAMPLE 3

(Preparation of Saponified Cellulose Triacetate Film)

A commercially available cellulose triacetate film (Fujitac TD80UF, Fuji Photo Film Co., Ltd.) was blown with hot air heated at 100° C., and thereby heated to 55° C. The thus-heated film was coated with the below-described alkaline saponifying solution (S-17) kept at 25° C. by means of a rod coater in the amount of 8 ml/m², and left for 10 seconds. Pure water was then applied onto the film in the amount of 5 ml/m² by means of the rod coater while the film was kept at 45° C. The film was further coated and washed with pure water in the amount of 1,000 ml/m² by means of an extrusion coater. After left for 5 seconds, the film was blown with air jetted from an air-knife at 100 m/second to drain the aqueous layer. The washing with the fountain coater and the draining with the air-knife were repeated twice, and then the film was left in a drying zone at 80° C. for 10 seconds. Thus, a saponified film KF-17 was prepared. The prepared film gave the contact angle of 42° with water, and had the surface free energy of 55 mN/m.

The alkaline saponifying solution (S-17) consisted of 6.7 wt. % of NaOH, 1.2 wt. % of a nonionic surface active agent (K-4), 0.1 wt. % of a defoaming agent (PLURONIC TR701, Asahi denka Co., Ltd.), 55 wt. % of propyl alcohol, 5 wt. % of methyl isobutyl ketone, 5 wt. % of isopropyl acetate, 5 wt. % of propylene glycol, and 22 wt. % of pure water. The alkaline saponifying solution (S-17) had the surface tension of 20 mN/m, the viscosity of 5.2 Pa·s, the density of 0.93 and the electro-conductivity of 18.5 mS/cm.

The procedure for preparing the saponified film KF-17 was repeated except that the contents of pure water, propyl alcohol and methyl isobutyl ketone in the solution S-17 were changed to prepare other alkaline solutions having different surface tensions, to prepare saponified films KF-18 to KF-20. Optical compensatory sheets KHF-17 to KHF-20 were produced from the prepared films KF-17 to KF-20, and evaluated in the same manner as in Example 1.

The results are set forth in Table 3.

TABLE 3

| Sheet | Surfactant | Surface tension | Haze | Grade[1] | Tapes[2] |
|---|---|---|---|---|---|
| KHF-17 | K-6 | 20 mN/m | 0.33 | A | 0 |
| KHF-18 | K-6 | 32 mN/m | 0.33 | A | 0 |
| KHF-19 | K-6 | 38 mN/m | 0.46 | A | 0 |
| KHF-20 | K-6 | 44 mN/m | 0.87 | B | 0 |

Remarks:
[1]grade in view of unevenness and defects, and
[2]number of adhesive tapes breaking the sample in the peeling test.

As shown in Table 3, the compensatory sheets comprising the films saponified according to the present invention (KHF-17 to KHF-20) gave slightly impaired haze when the alkaline solutions had high surface tensions, and further in view of unevenness they were slightly deteriorated. However, the results were almost good.

EXAMPLE 4

(Preparation of Saponified Cellulose Triacetate Film)

A commercially available cellulose triacetate film (Fujitac TD80UF, Fuji Photo Film Co., Ltd.) was blown with hot air heated at 40° C., and thereby heated to 15° C. The thus-heated film was coated with the below-described alkaline saponifying solution (S-21) kept at 15° C. by means of a rod coater in the amount of 8 Ml/m², and left for 60 seconds. Pure water was then applied onto the film in the amount of 10 ml/m² by means of the rod coater while the film was kept at 15° C. The film was further coated and washed with pure water in the amount of 800 ml/m² by means of an extrusion coater. After left for 8 seconds, the film was blown with air jetted from an air-knife at 80 m/second to drain the aqueous layer. The washing with the fountain coater and the draining with the air-knife were repeated twice, and then the film was left in a drying zone at 60° C. for 30 seconds. Thus, a saponified film KF-21 was prepared. The prepared film gave the contact angle of 48° with water, and had the surface free energy of 61 mN/m.

The alkaline saponifying solution (S-21) consisted of 8.0 wt. % of KOH, 1.0 wt. % of a nonionic surface active agent (K-3), 0.01 wt. % of a defoaming agent (PLURONIC TR701, Asahi denka Co., Ltd.), 60 wt. % of isopropyl alcohol, 4 wt. % of isopropyl acetate, 10 wt. % of propylene glycol, and 16.99 wt. % of pure water. The alkaline saponifying solution (S-21) had the surface tension of 22 mN/m, the viscosity of 4.8 Pa·s, the density of 0.92 and the electro-conductivity of 20.5 mS/cm.

The procedure for preparing the saponified film KF-17 was repeated to prepare a saponified film KF-21. An optical compensatory sheet KHF-21 was produced from the prepared film KF-21, and evaluated in the same manner as in Example 1.

The results are set forth in Table 4.

TABLE 4

| Sheet | Surfactant | Surface tension | Haze | Grade[1] | Tapes[2] |
|---|---|---|---|---|---|
| KHF-21 | K-3 | 22 mN/m | 0.53 | A | 0 |

Remarks:
[1]grade in view of unevenness and defects, and
[2]number of adhesive tapes breaking the sample in the peeling test.

As shown in Table 4, the compensatory sheet comprising the film saponified according to the present invention (KHF-21) was excellent in haze, unevenness and mechanical strength.

EXAMPLE 5

Iodine was adsorbed onto a stretched polyvinyl alcohol film to prepare a polarizing membrane. On one surface of the membrane, each optical compensatory sheet prepared in Example 1 (KHF-2 to KHF-10) was laminated. Independently, a commercially available cellulose triacetate film (Fujitac TD80UF, Fuji Photo Film Co., Ltd.) was saponified and laminated on the other surface. The prepared composition was then dried at 80° C. for 10 minutes.

The polarizing membrane and the compensatory sheet were placed so that the transmission axis of the membrane might be parallel to the slow axis of the sheet. The commercially available cellulose triacetate film was also placed so that the transmission axis of the membrane might be perpendicular to the slow axis of the commercially available film. Thus, a polarizing plate (HB-2 to HB-10) was prepared.

A pair of polarizing plates were removed from a commercially available liquid crystal display of TN mode (6E-A3, Sharp Corporation). In place of the removed polarizing plates, the above-prepared polarizing plate was laminated on each side of the liquid crystal cell with an adhesive, so that the compensatory sheet side of each polarizing plate might be on the side of the cell. The polarizing plate on the viewing side and that on the backlight side were placed so that the transmission axes of the viewing side plate and the backlight side plate might be arranged in O mode. Thus, a liquid crystal display was prepared.

The prepared liquid crystal display was made to give an image with black tone (L1) by means of an apparatus (EZ-Contrast 160D, ELDIM), and it was observed with the eyes whether the image had defects or not.

The results are set forth in Table 5. As shown in Table 5, the polarizing plate HB-2 (which comprised the compensatory sheet containing no surface active agent) and a display comprising a compensatory sheet containing only 0.08% of surface active agent gave images having fogs distributed all over the screens and accordingly having poor brightness. On the other hand, the images given by the displays using the polarizing plates HB-3 to HB-10 (which had films saponified according to the invention) had high brightness. A comparison display comprising a film containing a surface active agent in an excess amount of the range regulated in the invention also gave an image having fogs distributed all over the screen.

TABLE 5

| Plate | Sheet | Saponification | Defects in displayed image |
|---|---|---|---|
| HB-2 | KHF-2 | Conventional | Fogs all over the screen |
| HB-3 | KHF-3 | Invention | Not observed |
| HB-4 | KHF-4 | Invention | Not observed |
| HB-5 | KHF-5 | Invention | Not observed |
| HB-6 | KHF-6 | Invention | Not observed |
| HB-7 | KHF-7 | Invention | Not observed |
| HB-8 | KHF-8 | Invention | Not observed |
| HB-9 | KHF-9 | Invention | Not observed |
| HB-10 | KHF-10 | Invention | Not observed |

EXAMPLE 6

A cellulose acylate film provided with an anti-reflection film was prepared in the manner described in Japanese Patent Provisional Publication No. 2002-182033. On the anti-stain layer of the cellulose acylate film, a commercially available polyethylene terephthalate film (SAT-106TS, Sanei Chemicals Co., Ltd.) was laminated. The layered film was then immersed at 45° C. for 30 seconds in the below-described alkaline saponifying solution (S-22), which was charged in a master etching processor for electronic photo-engraving system (E-380II). The film was then immersed in pure water to wash away the alkaline solution well. After further immersed in 0.5% sulfuric acid aqueous solution for 10 seconds, the film was again immersed in pure water to wash away the acidic solution well. The film was dried at 100° C., to prepare a saponified cellulose acylate film (KF-22). From the obtained layered film, the polyethylene terephthalate film was peeled to prepare a first protective film for polarizing plate.

The alkaline saponifying solution (S-22) consisted of 8.0 wt. % of KOH, 42 wt. % of propyl acetate, 18 wt. % of isopropyl acetate, 12 wt. % of diethylene glycol, 18 wt. % of pure water, 1.0 wt. % of a surface active agent of betaine type (AMORGEN-K, Dai-ichi Kogyo Seiyaku Co., Ltd.), 0.95 wt. % of D-sorbitol, and 0.05 wt. % of a defoaming agent (SURFYNOL, Nissin Chemical Industry Co., Ltd.).

(Preparation of Polarizing Plate)

In 1,000 weight parts of water, 7 weight parts of iodine and 105 weight parts of potassium iodide were dissolved to prepare an iodine solution. In the prepared solution, a commercially available polyvinyl alcohol film of 25 μm thickness (Kuraray co., Ltd.) was immersed for 5 minutes to adsorb iodine. The film was then laterally and uniaxially stretched in a 4 wt. % boric acid aqueous solution at 40° C., so that the film might be 4.4 times as wide as the original. The film was then dried with the tension kept, to prepare a polarizing membrane. On one surface of the membrane, the first protective film for polarizing plate was laminated with a polyvinyl adhesive so that the saponified surface of the protective film might be in contact with the membrane. Each of the compensatory sheets prepared in Example 2 (KHF-11 to KHF-16) was saponified and laminated on the other surface of the membrane. The layered composition was dried at 80° C. for 10 minutes, to prepare a polarizing plate (HB-11 to HB-16).

(Evaluation of Polarizing Plate)

With respect to each polarizing plate prepared above, 100 plates were produced. The 100 plates were laminated on glass boards with an acrylic adhesive, to prepare samples. The samples were left under the atmosphere of 70° C. and 90% RH for 12 hours, and then under the atmosphere of 25° C. and 90% RH for 12 hours. For 1,200 hours, the samples were repeatedly and alternatively left under the above two atmospheres. After that, it was observed whether each plate was peeled from the board and whether bubbles were formed in each plate or not. As a result, none of the plates were peeled and no bubble was observed.

A liquid crystal display comprising each above-prepared polarizing plate was produced in the same manner as in Example 4. Each prepared liquid crystal display was made to give an image with black tone (L1) by means of an apparatus (EZ-Contrast 160D, ELDIM), and it was observed with the eyes whether the image had defects or not. As a result, neither defect nor unevenness was observed in all the displays.

The invention claimed is:

1. A process for alkali saponification of only one side of a cellulose ester film surface, which comprises the steps of heating a cellulose ester film at a temperature of higher than room temperature, coating a solution of an alkali in a mixture of water and an organic solvent at a mixing ratio of water/organic solvent in the range of 5/95 to 60/40 by weight onto the only one side of the cellulose ester film surface, keeping the temperature of the film not lower than the room temperature, and washing away the alkaline solution from the film.

2. The process as defined in claim 1, wherein the steps are carried out while conveying the cellulose ester film.

3. The process as defined in claim 1, wherein the normality of the alkaline solution is in the range of 0.1 to 5 N, and the amount of the coated alkaline solution is in the range of 1 to 50 ml/m².

4. The process as defined in claim 1, wherein the alkali is a hydroxide of alkali metal, and the organic solvent is selected from the group consisting of alcohols having 1 to 8 carbon atoms, ketones having 1 to 6 carbon atoms, esters having 1 to 6 carbon atoms, and polyhydric alcohols having 1 to 6 carbon atoms.

5. The process as defined in claim 1, wherein the alkaline solution contains a nonionic surface active agent in an amount of 0.1 to 10 wt. %.

6. The process as defined in claim 5, wherein the nonionic surface active agent is represented by the formula (1):

R1-L1-Q1   (1)

in which R1 is an alkyl group having 8 or more carbon atoms; L1 is a bond or a divalent linking group between R1 and Q1; and Q1 is a nonionic hydrophilic group.

7. The process as defined in claim 5, wherein the nonionic surface active agent is represented by the formula (2):

R2-L2-Q2   (2)

in which R2 is an alkyl group having 8 or more carbon atoms; L2 is a bond or a divalent linking group between R2 and Q2; and Q2 is a nonionic hydrophilic group selected from the group consisting of polyoxyethylene unit having a polymerization degree of 5 to 150, polyglycerol unit having a polymerization degree of 3 to 30, and a hydrophilic saccharide chain unit.

8. The process as defined in claim 1, wherein the cellulose ester film has a thickness in the range of 30 to 200 μm.

9. The process as defined in claim 1, wherein the cellulose ester film surface is coated with the solution by die coater, a roll coater, a rod coater, a gravure coater or a blade coater.

* * * * *